United States Patent
Kielty, Jr. et al.

(10) Patent No.: US 6,639,983 B1
(45) Date of Patent: Oct. 28, 2003

(54) ADAPTABLE LINE DRIVER INTERFACE FOR DIGITAL TELEPHONE SYSTEMS

(75) Inventors: Eugene E. Kielty, Jr., Depew, NY (US); Steven G. DeNies, East Aurora, NY (US); Robert H. Fritzinger, Williamsville, NY (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/327,279

(22) Filed: Jun. 4, 1999

Related U.S. Application Data

(63) Continuation-in-part of application No. 09/009,561, filed on Jan. 20, 1998, now Pat. No. 5,999,593.

(51) Int. Cl.[7] .......................... H04M 1/00; H04M 11/00
(52) U.S. Cl. ............................. 379/399.01; 379/387.01; 379/394; 379/93.05
(58) Field of Search ...................... 379/93.05–93.07, 379/93.29, 198, 225, 201, 207, 387, 394–395.01, 398–400, 402–404, 441–442, 156

(56) References Cited

U.S. PATENT DOCUMENTS

| | | | | |
|---|---|---|---|---|
| 4,103,118 A | * | 7/1978 | Bergman | 379/403 |
| 5,151,935 A | * | 9/1992 | Slife et al. | 379/201 |
| 5,333,177 A | * | 7/1994 | Braitberg et al. | 379/441 |
| 5,642,410 A | * | 6/1997 | Walsh et al. | 379/201 |
| 5,649,001 A | * | 7/1997 | Thomas et al. | 379/93.29 |
| 5,802,169 A | * | 9/1998 | Frantz et al. | 379/398 |
| 5,875,242 A | * | 2/1999 | Glaser et al. | 379/207 |
| 5,999,593 A | * | 12/1999 | Krawiec et al. | 379/156 |
| 6,343,126 B1 | * | 1/2002 | Stelman | 379/93.05 |

FOREIGN PATENT DOCUMENTS

| | | |
|---|---|---|
| WO | WO 99/37076 | 7/1999 |

\* cited by examiner

*Primary Examiner*—George Eng
(74) *Attorney, Agent, or Firm*—Blakely, Sokoloff, Taylor & Zafman LLP

(57) ABSTRACT

A universal line driver interface which enables a digital telephone computer/telephony interface to configure itself automatically or on the fly to accommodate different PBXs. The interface is connected to a PBX and to a digital telephone. The interface also is connected to network interface logic. A microcontroller, which is part of the computer in the computer telephony system, is connected in controlling relation to the interface and to the interface logic. The microcontroller under program control changes operational parameters in the interface as a function of electrical characteristics of the particular type of PBX to which the interface is connected. The changes in operation parameters of the interface, in turn, are used to configure the interface logic depending upon the type of PBX. The universal nature of the interface is achieved by adaptability to different transmission and receiver voltage, levels and an ability to match a range of telephone line impedances.

55 Claims, 15 Drawing Sheets

US 6,639,983 B1

ADAPTABLE LINE DRIVER INTERFACE FOR DIGITAL TELEPHONE SYSTEMS

This application is a continuation-in-part of application Ser. No. 09/009,561 file date Jan. 20, 1998 entitled "System and Method for Automatic PDX Detection", now issued as U.S. Pat. No. 5,999,593 to Guillermo Damian Krawiec and Eugene E. Kielty, Jr. and commonly assigned to the assignee of the present invention.

BACKGROUND OF THE INVENTION

This invention relates to the art of telephone systems, and more particularly to a new and improved system and method for automatically configuring a digital telephone computer/telephony interface.

In a basic PBX (private branch exchange) configuration, the PBX is connected between the central office switch and the individual telephone stations. In a computer/telephony integration a computer is connected to one of the station lines to emulate the telephone terminals with the end result of controlling most of the features offered by the PBX through the computer interface. The computer/telephony interface must be configured to meet the characteristics of the PBX. Heretofore, this has been accomplished by providing different hardware modules for each type of PBX and selecting the modules by relay systems or the like. This approach undesirably is hardware dependent, can require a large number of components if many different types of PBXs are to be accommodated, and typically is restricted to a certain range of loop lengths, i.e. line distance from the PBX.

It would, therefore, be highly desirable to provide a system and method for configuring a digital telephone computer/telephony interface automatically or "on the fly" to accommodate different PBXs. As a result, in computer/telephony integration fewer components would be required with the advantages of reduced board size and lower cost. With such automatic configuring, when the digital telephone system is to be used with a different type of PBX, the necessary changes are carried out internally rather than by external means involving changing or adding hardware.

SUMMARY OF THE INVENTION

The present invention provides a universal line driver interface which enables a digital telephone computer/telephony interface to configure itself automatically or on the fly to accommodate different PBXs. The interface is connected to a PBX and to a digital telephone. The interface also is connected to network interface logic. A microcontroller, which is part of the computer in the computer telephony system, is connected in controlling relation to the interface and to the interface logic. The microcontroller under program control changes operational parameters in the interface as a function of electrical characteristics of the particular type of PBX to which the interface is connected. The changes in operation parameters of the interface, in turn, are used to configure the interface logic depending upon the type of PBX. The universal nature of the interface is achieved by adaptability to different transmission and receiver voltage levels and an ability to match a range of telephone line impedances.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENT

Figure 1:
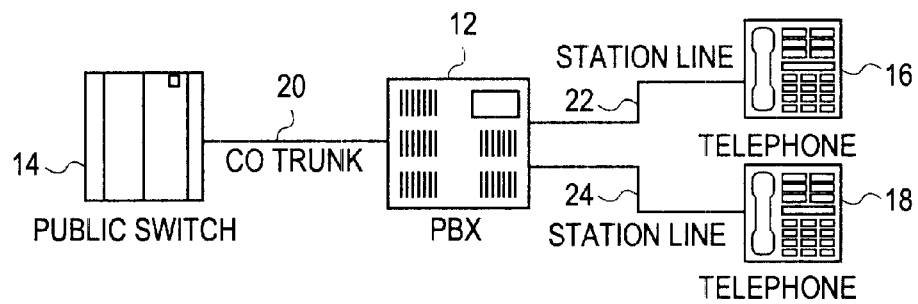
FIG. 1 is a diagrammatic view illustrating a basic PBX configuration.

In a basic digital PBX configuration as shown in FIG. 1, a PBX 12 stands between a Central/Public Office (CO) switch 14 and the individual stations, two of which are designated 16 and 18 in FIG. 1. The CO trunk 20 connects the CO 14 to the PBX 12 and can involve one of several types of communication protocols and/or methods. Each station line 22 and 24 is the communication line between the PBX 12 and the individual station telephones 16 and 18, respectively. Each station line also can use one of various communication methods.

Since the PBX 12 stands between the CO 14 and the telephones 16, 18, it can provide electrical and signaling isolation between the two of them. Because of this, the communication standards between the PBX 12 and the CO 14 and those between the telephones 16, 18 and the PBX 12 do not necessarily have to be identical. It is the PBX 12 that performs the "translation" between them. The communication protocols between the CO 14 and the PBX 12 are and always have been open standards. On the other hand, the station 16, 18 to PBX 12 communication protocols historically have been proprietary protocols.

Figure 2:
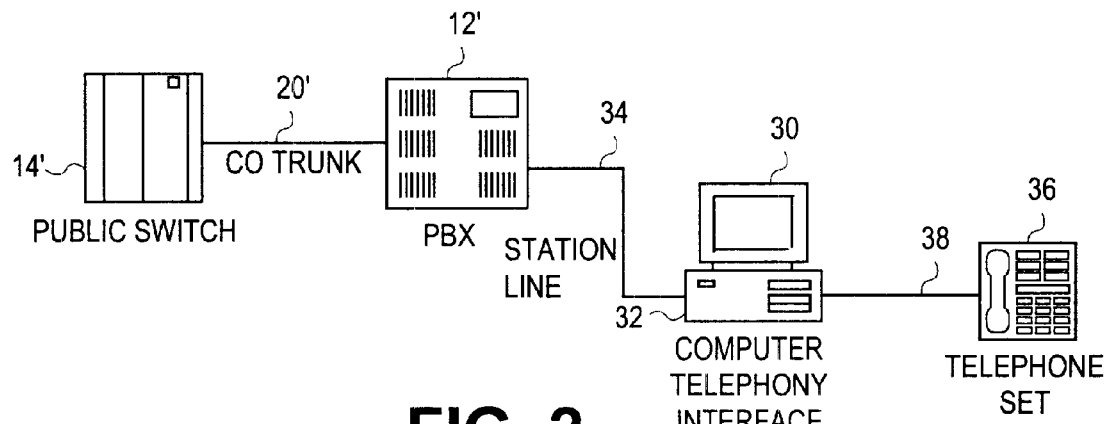
FIG. 2 is a diagrammatic view illustrating a basic PBX and computer telephony interface configuration.

In a computer/telephony interface a computer 30 is connected to one of the station lines to emulate the telephone terminals with the end result of controlling most of the features offered by the PBX through the computer interface. As shown in FIG. 2, computer interface 32 is connected to station line 34 and is connected to a digital telephone set 36 by line 38. The computer/telephony interface 32 "opens up" the proprietary signaling protocols of the PBX. By emulating the telephone terminals it is possible to fool the PBX 12' into thinking that it is connected to one of them. Once this is done, it is possible to control most of the features offered by the PBX 12' through the computer interface 32. The computer/telephony interface 32 shown in FIG. 2 is of the type commercially available from Voice Technologies Group of Buffalo, N.Y. under the designation VoiceBridge PC.

Briefly, interface 32 uses digital phone emulation to provide a direct digital connection between PBX 12' and computer 30. Once interface 32 convinces PBX 12' that it is a proprietary digital phone, interface 32 accepts all the information the PBX 12' gives it and transforms that information to a standard application program interface (API) command set that the computer telephony system can understand. This, in term, increases the amount of call information and signals available to the system from PBX 12'.

Figure 3:
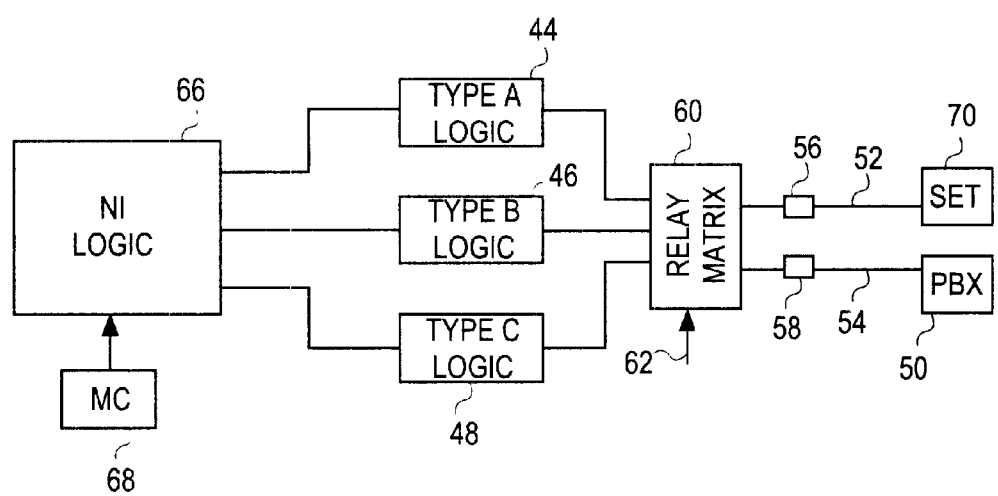
FIG. 3 is a block diagram of one form of interface arrangement used in the computer telephony system of FIG. 2.

FIG. 3 illustrates one form of arrangement for use in computer telephony systems and including separate line driver/receiver interface analog sections for digital telephones with different formats and specifications. The arrangement of FIG. 3 enables a computer telephony system of the type shown in FIG. 2 to operate with different varieties of PBX. In the example of FIG. 3, there are three line driver/receiver interface analog sections, i.e. logic sections, 44, 46 and 48 corresponding to three different types of PBX: A, B and C, respectively. For example, types A, B and C could be Lucent, Northern Telecom and Rolm, respectively. A PBX 50 similar to PBX 12 of FIGS. 1 and 2 has a standard digital line 54 which connects PBX 50 to a user's telephone network. Line 54 is connected via a standard RJ45 connector 58 to a relay matrix 60 which, in turn, is connected to logic sections 44, 46 and 48. A control signal on line 62 or other appropriate command causes matrix 60 to connect PBX 50 to the appropriate one of logic sections 44, 46 or 48 depending upon which type PBX 50 is, i.e., type A, B or C in the present illustration. Logic, which corresponds to the particular logic section 44, 46 or 48, is downloaded from a controller 68 to a network interface 66 which is a component of the computer telephony interface 32 in the system of FIG. 2. Interface 66 also is known as a telephony programmable gate array. Controller 68 controls operation of interface 66. A digital telephone 70 similar to phone 36 in FIG. 2 is connected via line 52 to a standard RJ45 connector 56 to the relay matrix 60. In a manner similar to that of the PBX line 54, this telephone line 52 is connected through the matrix 60 to a logic section 44, 46 or 48 and to the network interface logic 66. The controller 68 controls this connection to the telephone 70 in a similar fashion as it controls the connection to the PBX 50.

Figure 4A:
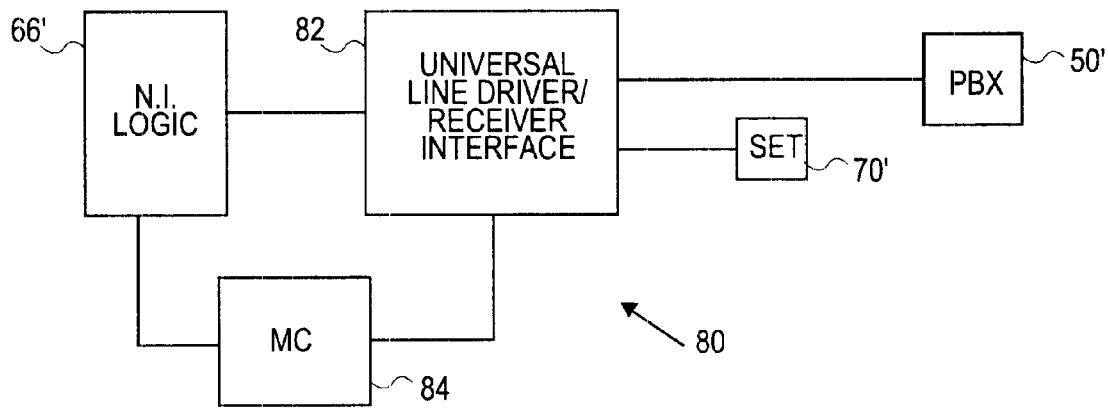
FIG. 4A is a block diagram illustrating one form of the system and method of the present invention.

FIG. 4A illustrates one form of the system and method of the present invention. Instead of the separate logic sections 44, 46 and 48 plus relay matrix 60 of the arrangement of FIG. 3, the system 80 of the present invention includes a universal line driver interface 82 which enables a digital telephone computer/telephony interface to configure itself automatically or on the fly to accommodate different PBXs. Interface 82 is connected to PBX 50' and to digital telephone 70'. Interface 82 also is connected to network interface logic 66'. A microcontroller 84, which is part of the computer in the computer telephony system, is connected in controlling relation to interface 82 and to interface logic 66'. Controller 84 under program control changes operational parameters in interface 82 as a function of electrical characteristics of the particular type of PBX to which interface 82 is connected. Controller 84 under program control changes the operational parameters in the network interface logic 66' also as a function of electrical characteristics of the particular type of PBX to which interface 82 is connected. The universal nature of interface 82 is achieved by adaptability to different transmission and receiver voltage levels and an ability to match a range of telephone line impedances, all of which will be described in detail presently.

As compared to the system of FIG. 3, the system of the present invention shown in FIG. 4 advantageously has fewer components thereby resulting in reduced board size and lower cost. When PBX 50 is to be changed, i.e. from Lucent to Rolm, for example, the circuit of FIG. 4 advantageously need not be changed. The reconfiguration to accommodate the different PBX is done in software via microcontroller 84 rather than by changing or adding hardware. In addition, whereas the system of FIG. 3 is designed for a given range of loop lengths, i.e. distance to PBX along lines 52, the system of the present invention shown in FIG. 4 can accommodate significantly different loop lengths.

Figure 4B:
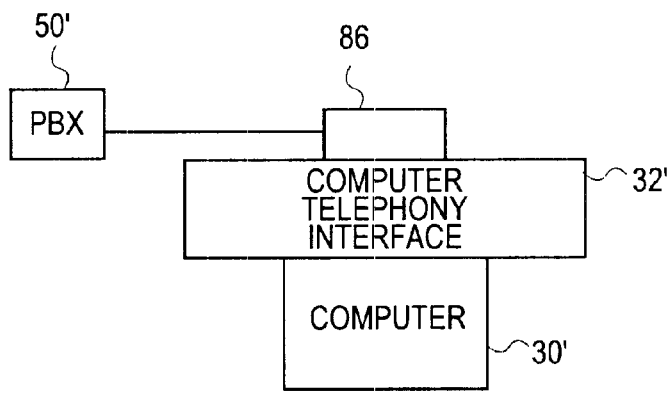
FIG. 4B is a block diagram of another form of the system and method of the present invention.
Figure 4C:
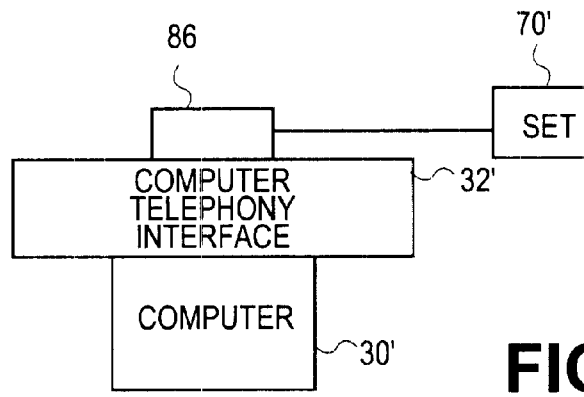
FIG. 4C is a block diagram of still another form of the system and method of the present invention.
Figure 4D:
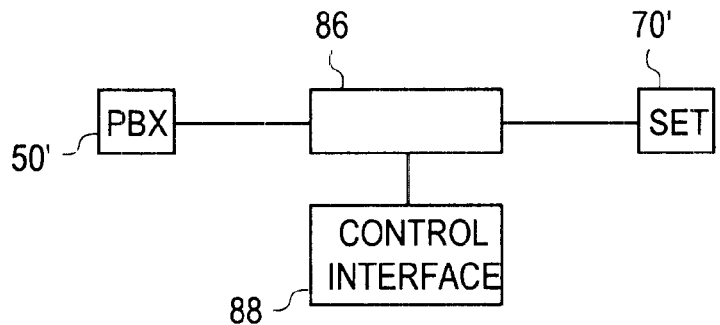
FIG. 4D is a block diagram of yet another form of the system and method of the present invention.

While the system of FIG. 4A is illustrated with a single PBX 50' and a single set 70', it is within the scope of the present invention to employ the system of FIG. 4A with a plurality of switches or PBXs 50', with a plurality of sets 70' and with both a plurality of PBXs 50' and a plurality of sets 70'. There may be situations where the system of the present invention is utilized only with a switch or PBX 50', i.e. with one or more switches or PBXs 50' as shown in FIG. 4B, and with no telephone set. In FIG. 4B, the system of the present invention, including network interface logic 66', universal line driver interface 82 and microcontroller 84 is represented generally at 86. Similarly, the system of the present invention may be used with only one or more telephone sets 70' and with no PBX or switch as shown in FIG. 4C. Also, it is within the scope of the present invention to employ the foregoing system with one or more switches or PBXs 50', one or more telephone sets 70' and with a control interface device 88 instead of computer 30' as shown in FIG. 4D. For example, control interface 88 can be another telephone set, a modem or a handset.

Figure 5:
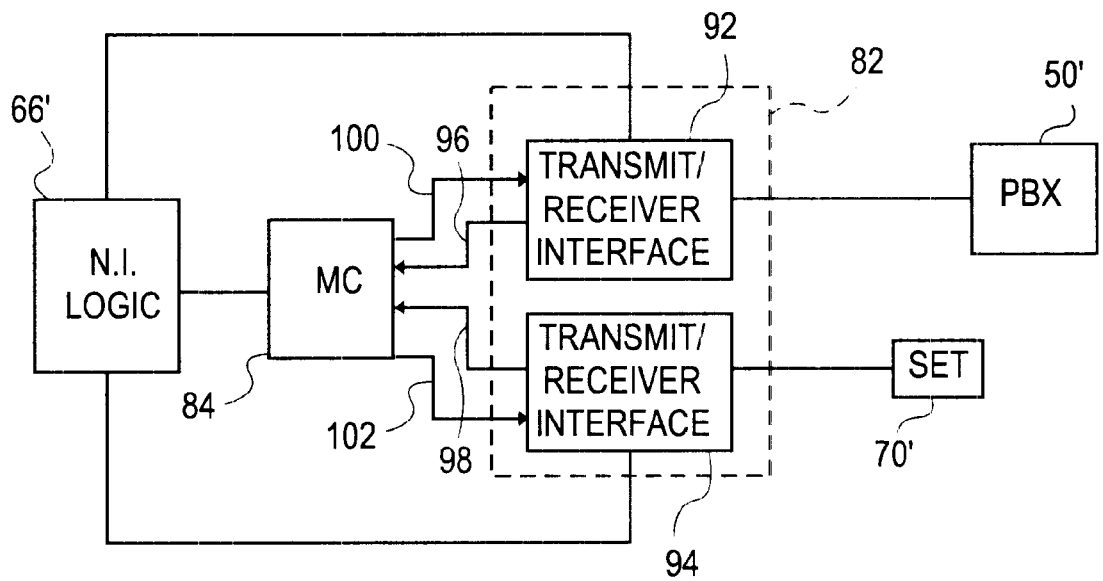
FIG. 5 is a block diagram illustrating the universal interface of the system of FIG. 4 in further detail.

The system 80 of the present invention including interface 82 is shown in further detail in FIG. 5. Interface 82 includes a pair of transmit/receiver interface sections 92 and 94, one for the PBX side the other for the set side. Each section includes a special purpose analog duplexer for separating transmitted and received signals. In particular, each section includes a receiver portion and a transmitter portion with a nulling circuit in the receiver portion to null the transmitting signal in the receiver portion. Microcontroller 84 monitors signals in both interface sections 92 and 94 via paths 96 and 98, respectively, and sends control signals via paths 100 and 102 to interface sections 92 and 94, respectively, to make the appropriate changes in parameters therein depending upon characteristics of the particular PBX to which interface 82 is connected. In particular, microcontroller 84 monitors analog signals in interface sections 92 and 94 including peak null voltages, peak signal levels, averaged and offset voltages as will be described in detail presently. Under program control, microcontroller 84 sends command signals to interface sections 92 and 94 to control nulling voltages in the receiver nulling sections, to adjust threshold voltages in comparators included in the receiver sections and to adjust transmit signal levels in the transmitter sections, all of which will be described in detail presently. Thus, by means of an A/D converter microcontroller 84 monitors the signal levels in interface sections 92, 94 and periodically adjusts digital potentiometers or the like in the circuits of interface sections 92, 94 to change the signals to the desired levels in a manner which will be described. Accordingly, the system of the present invention provides automatic matching to a range of line impedances, using nulling circuits in interface sections 92, 94 under control of microcontroller 84. This allows minimization of line return loss and interference between transmitted and received signal. Each nulling signal is adjusted by transmitting a signal with no other receiver signal present and nulling the receiver signal as sensed by peak signal readers, all of which will be described in detail presently.

Figure 6:
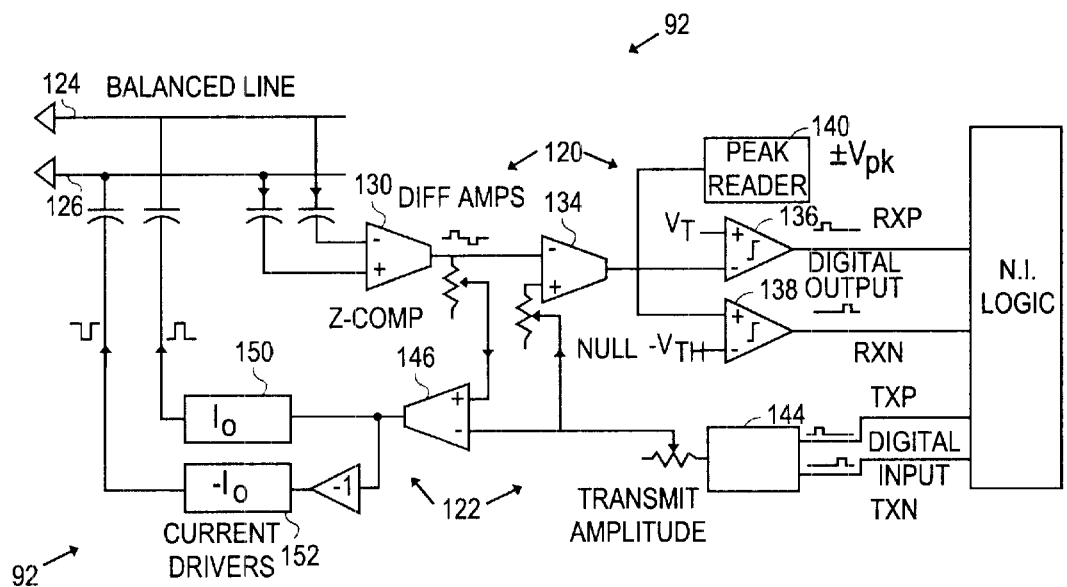
FIG. 6 is a block diagram of one of the transmit/receiver interface sections of the universal interface of FIG. 5.

FIG. 6 is a block diagram of one of the transmit/receiver interface sections, for example interface section 92 on the PBX side, it being understood that the other interface section 94 on the set side is identical. Interface 92 includes a receiver and nulling section 120 and a transmitter section 122. Both sections 120 and 122 are connected to PBX 50' by a balanced line pair 124, 126. The receiver section 120 has an input coupled to lines 124, 126 and includes an AC-coupled differential amplifier 130. After nulling of the transmitting signal by a duplexer including another difference amplifier 134, the received signal is detected by a pair of comparators 136 and 138. One comparator 136 detects positive received pulses above an adjustable threshold, and the other comparator 138 similarly detects the negative pulses. A peak reader 140 is operatively associated with comparators 136 and 138 in a manner which will be described. The receiver outputs (RXP and RXN) are standard digital levels, as are the corresponding transmit inputs (TXP and TXN).

In the transmitter section 122 the transmit input pulses TXP and TXN are converted to adjustable amplitude positive and/or negative pulses by a bipolar driver 144. After passing through an impedance feedback compensation amplifier 146, the signal is sent to current drivers 150 and 152. One driver 150 produces a positive current (+I°) for a positive transmitting pulse, and the other driver 152 simultaneously procedures an equal amplitude negative pulse (−I°). The pair of + and − current sources 150 and 152 (+I° and −I°) are a balanced transmitting source for the balanced line 124, 126 even though the two current drivers 150, 152 are individually unbalanced or ground-referenced.

The current drivers 150, 152 are constant current sources that output a current (I°) proportional to the input voltage. An ideal current driver produces a constant output current independent of the load impedance or output voltage. In practice a current driver has a voltage limit or range (e.g., −10 to +10 volts). It is modeled by a current source with a shunt resistor (e.g. 1K) in parallel.

As previously described, there is one Tx/Rx interface 92 for the PBX side and another 94 for the set side. Thus interface 94 would be identical to interface 92 but with balanced lines 124, 126 connected to set 70. It is adjusted by transmitting a signal with no other receiver signal present and nulling the receiver signal as sensed by the peak readers 140. One advantage of this approach is that the circuit can adapt to actual, rather than just nominal, line impedances over a wide range so that the nulling will be more effective. The adjustable operation parameters are implemented by devices such as digital potentiometers in the circuits 92 and 94 controlled by microcontroller 84 in a manner which will be described.

Figure 7:
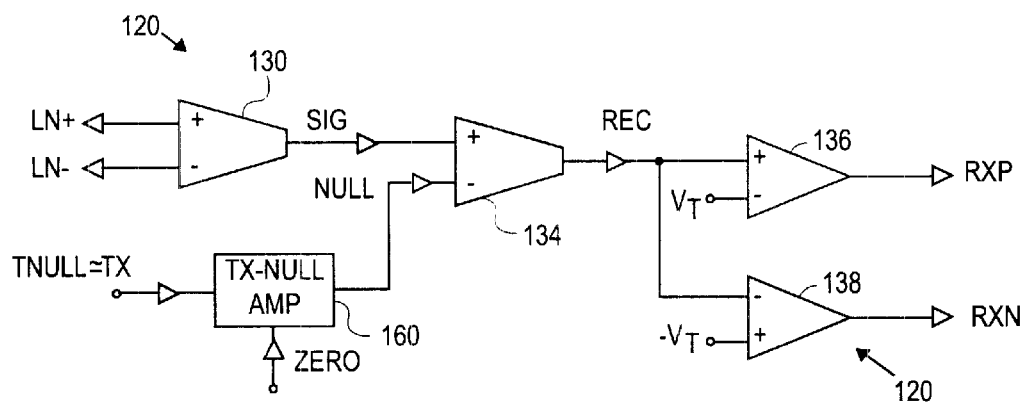
FIG. 7 is a block diagram of the receiver and nulling section of the transmit/receiver interface of FIG. 6.

The receiver and nulling section 120 of interface 92 is illustrated further in FIG. 7. The circuit includes the input amplifier 130, nulling circuit including transmit null amplifier 160 and difference amplifier 134, threshold circuit and comparators 136, 138. The input signals from the line coupler section (impedance or transformer as will be described), labeled LN+ and LN−, are nominally balanced with respect to ground. Typically they are pulses of either polarity in the range of 0.3 to 3 volts peak and 0.5 to 10 $\mu$s wide. The line impedance is nominally 100 ohms but may be higher, perhaps up to 200 ohms. The receiver and nulling section of interface 94 is identical to that shown in FIG. 7 except that the input signals LN+ and LN− are from set 70' rather than from PBX 50'.

Figure 8:
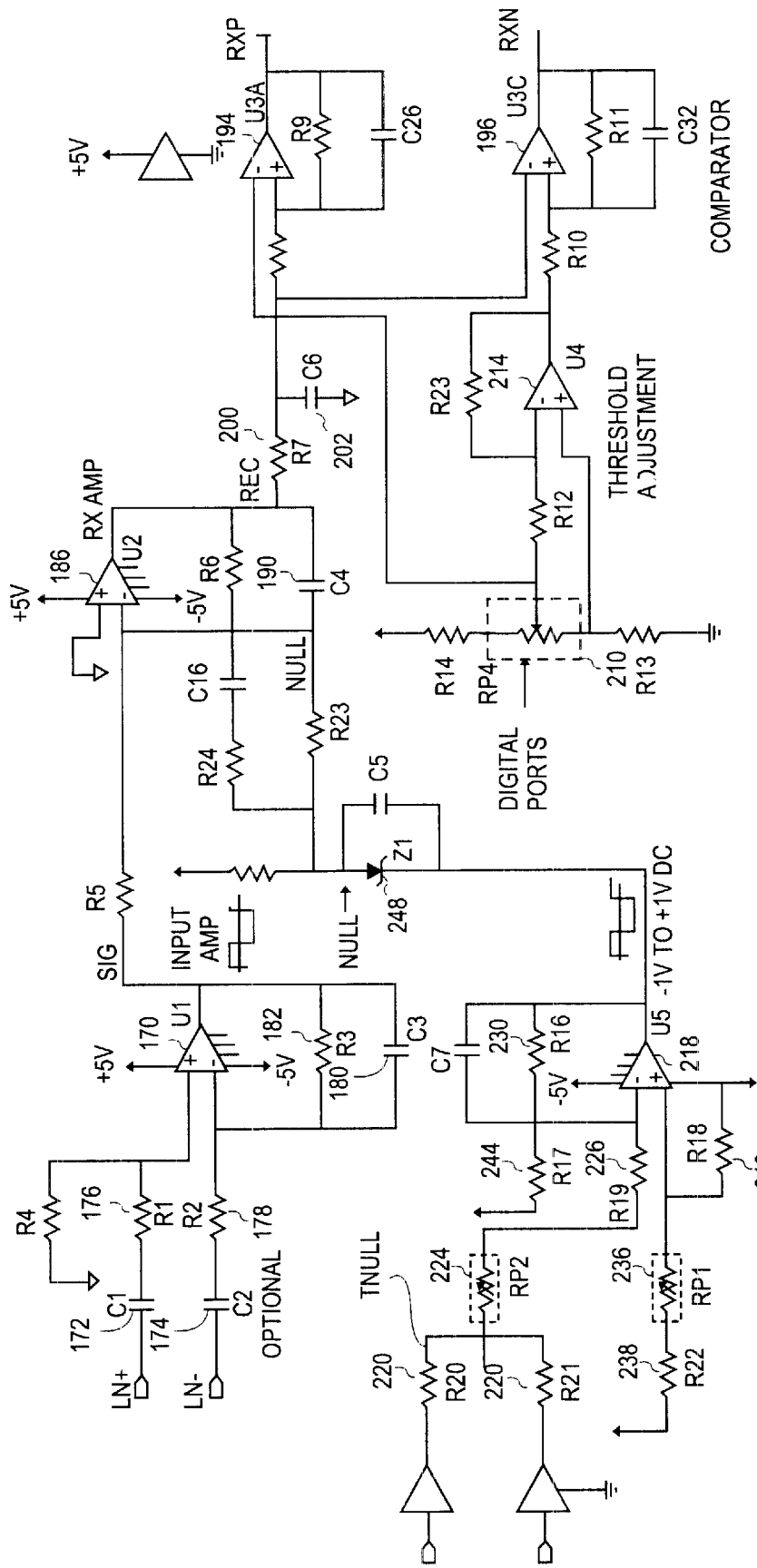
FIG. 8 is a schematic circuit diagram of the receiver and nulling section of FIGS. 6 and 7.

A detailed circuit diagram of the receiver and nulling section 120 of interface 92 is given in FIG. 8. The input stage (U1) is a differential amplifier 170 which converts the balanced signal to a single-ended signal (pulses) with respect to ground. It may provide gain, as needed for subsequent stages, but in the circuit of FIG. 8 there is unity gain. Optional input capacitors 172, 174 (C1, C2) act as a high pass filter with resistors 176, 178 ($R_1, R_2$) to limit the low frequency response and block dc if needed. A feedback capacitor 180 (C3) together with the feedback resistor 182, ($R_3$), determines the low pass response which limits the high frequency response of the amplifier. An operational amplifier with good high-frequency response is needed (Gain-bandwidth product over 30 Mhz). The output of this stage is labeled SIG.

The next stage (U2) is the nulling section of the duplexer and includes differential amplifier 186. Its main purpose is to cancel or null the signal on the line, and at the receiver input, due to its own transmitter section. To do this an equal magnitude, but opposite polarity, signal is applied to one input (NULL) while the signal (SIG) from the input receiver amplifier 170 is applied to the other. The output of the stage (REC) is then the receiver signal (from the external transmitter connected to the line) but without its own transmitted signal (an undesirable interference). In the circuit shown, amplifier 186 sums the inputs applied to the negative input terminal thereof. In the circuit shown, the gain is unity on both inputs but these may be changed to suit the signal levels for the next stage (comparators). Also additional high frequency filtering is provided by the feedback capacitor 190 (C4).

A second function for this circuit is to provide a positive offset voltage for the comparators. This is needed because the comparators selected do not allow a negative input while the signal has negative-going pulses. For example, the offset may be set to +2.0 v with a signal swing from −1.0 v (1 v negative pulse) to +3.0 (1 v positive pulse). Two comparators 194, 196 (U3A, U3C) are used, one to detect positive pulses and the other to detect negative pulses.

Another low pass filter 200, 202 (R7, C6) removes more of the high frequency signal, thus removing leading and falling edge transients and leaving only the smoothed pulses. Removal of the high frequency components is necessary because the transmitted signal and null signals do not match exactly in waveshape due to the different frequency response and propagation delay of the amplifier stages involved (especially the transmitter and transformer coupling which will be described presently). Thus the mismatch at the edges resulting in high frequency pulses, or glitches, at the output of nulling amplifier 186 must be removed by the low pass filters described above.

The high speed comparators 194, 196 have a standard digital output (CMOS, 0 to +5 v). Comparator 194 (U3A) produces a positive pulse output when the input pulse is positive (with respect to signal zero). Comparator 196 (U3C) produces a positive pulse output when the input pulse is negative. Both outputs remain low if the signal is at or close to zero (with respect to signal zero). Signal zero is, however, offset be a value $V_{os}$ shown in FIG. 8 (e.g. +v) with respect to analog ground at this point because the comparators do not accept a negative voltage.

Comparator threshold voltages can be adjusted via a digital potentiometer 210 (RP4) connected to the microcontroller 84. The positive pulse threshold voltage is adjustable relative to the offset voltage (signal zero), to a more positive value approximately equal to the most positive signal expected (e.g. 4 v). The negative pulse threshold is less positive than the offset voltage by the same magnitude that the positive pulse threshold exceeds the offset voltage. This is done through the inverting amplifier 214 (U4) with the VTH+ as the input but referenced to the offset voltage. Thus the positive and negative pulse thresholds track, that is, remain equal in magnitude with respect to the signal zero as the threshold potentiometer 210 (RP4) is adjusted. Typically the thresholds are adjusted to be 20% to 80% of the signal peak (with respect to signal zero) depending on the noise level and amplitude variation present. While digital potentiometer 210 is shown by way of example, other devices can be employed.

The TX-NULL amplifier 218 (U5) conditions the null signal (TNULL) for the null amplifier 186 (U2) discussed above. It does the following: variable gain amplification of the delayed transmit signal; adjustment of the dc level which sets the voltage offset at the null amplifier output (REC) and comparator inputs; and shapes the nulling signal waveform so that it better matches the transmitted signal at the line and this output (SIG) of the input amplifier 170. Voltage offset is required, at least with the components selected, because the digital potentiometers and digital input devices only work with positive voltages while the signals have a negative as well as a positive component with respect to signal zero.

The delayed transmit signal (TNULL) is produced by the same circuit, i.e. pulse converter, as the transmit signal, which will be described in detail presently, except that it is delayed in the digital section (programmable logic device) by an amount which approximates the propagation delay of the transmit amplifier (typically 50 to 200 ns). The signal has an offset of half digital level (+2.5 v). For a positive transmitted pulse, the signal becomes +5.0 v and for a negative pulse, it becomes zero. Thus the signal is +/−2.5 v in amplitude with a +2.5 v offset. Since this signal is produced by a resistor divider 220, 222 (R20 and R21), each having a magnitude of about 2 Kohm, the output (Thevenin) resistance is 1 Kohm. A zero to 10 Kohm digital potentiometer 224 (RP2) is in series plus resistor 226 (R19) (0.8K), produces a net amplifier input resistance of 1.8 to 11.8 Kohm in series with the 5 v signal. With a feedback resistance 230 (R16) of 3.3 KΩ, for example, the output corresponds to a nulling voltage (NULL) of 1.4 to 9.2 v (pp). The waveform of this signal (ac component) must be the same as the transmit signal seen at the output (SIG) of the input amplifier 170, except opposite in sign. While digital potentiometer 224 is shown by way of example, other devices can be employed.

The DC level or voltage offset of the nulling signal is determined, over a moderate range, by the setting of ZERO potentiometer 236 (RP1). The ratio of its resistance (0 to 10 Kohm) plus a series resistance 238, (R22) to a resistor 240 (R18) connected to the supply results in a 1.4 DC variation which, when added to the fixed offset produced by resistor 244 (R17) at the inverting input and the zener diode 248 (Z1), produce a DC offset at the null input to amplifier 186 (U2) which, finally, produces the desired signal offset (e.g. +2.9 v) at the comparator inputs (REC). The software ZERO adjustment feature via potentiometer 236 (RP1) is not essential to the operation of this device and the digital potentiometer may be replaced by a trimpot adjusted during manufacture or eliminated by the use of close tolerance components. The circuit for the receiver and nulling section of interface 94 is identical to that shown in FIG. 8 except that the input signals LN+ and LN− are from set 70' rather than from PBX 50'.

Figure 9:
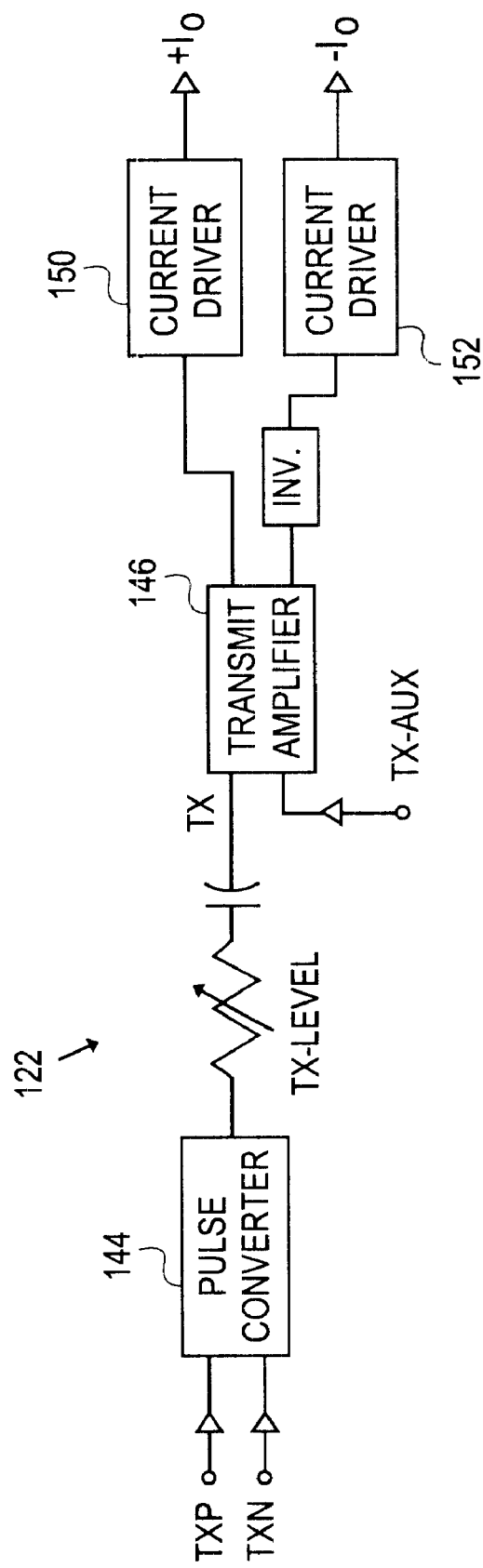
FIG. 9 is a block diagram of the transmit section of the transmit/receiver of FIG. 6.

The transmitter section 122 of the Tx/Rx interface 92 of FIG. 6 is illustrated further in FIG. 9. It has three main components including pulse converter 144, analog pulse amplifier 146 with inverter and a pair of constant current drivers 150 and 152 (one non-inverting and one inverting). The transmitter section of interface 94 is identical to that shown in FIG. 9 except that the output signals I+ and I− are sent to set 70' rather than to PBX 50'.

Figure 10:
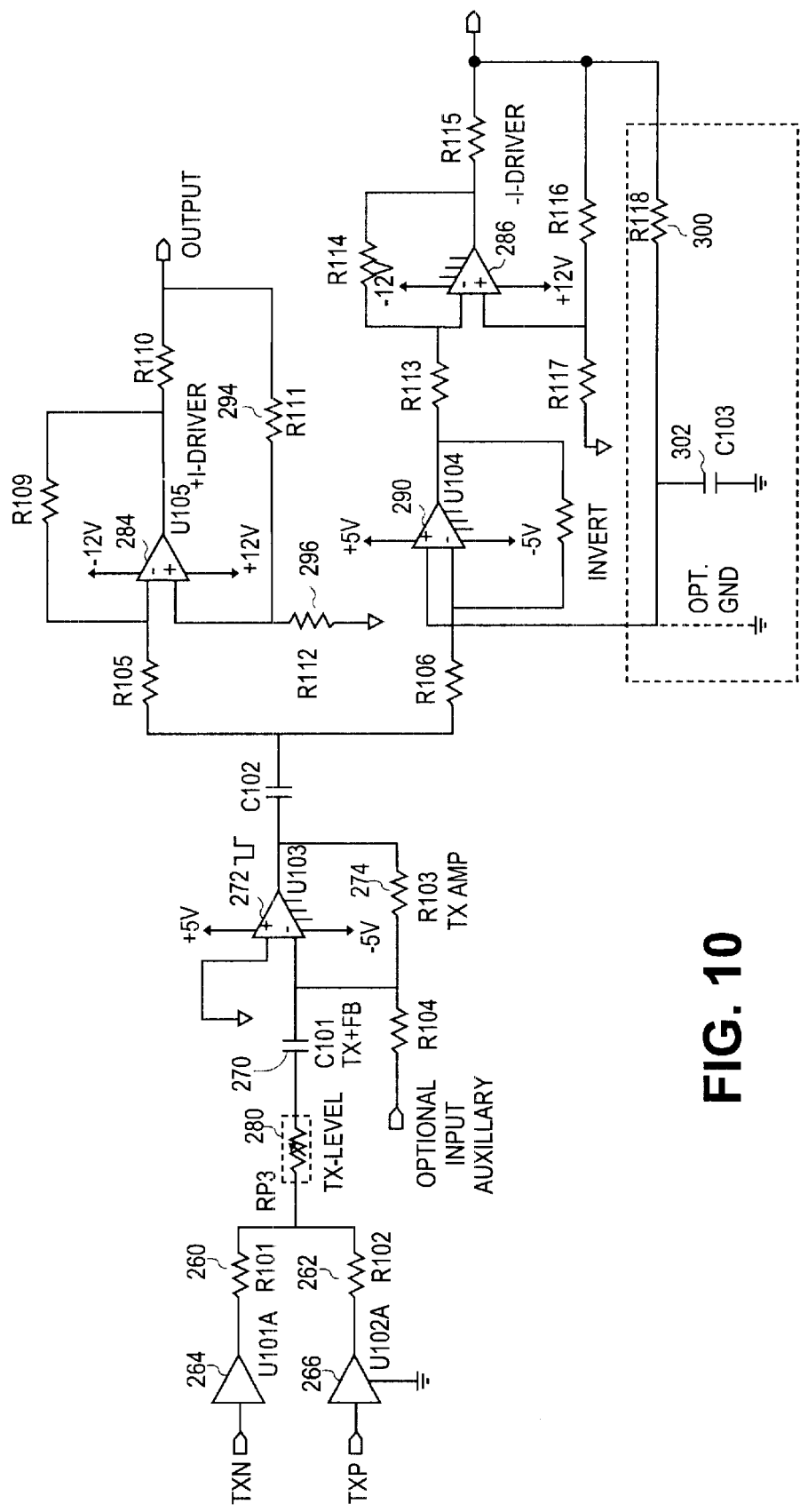
FIG. 10 is a schematic circuit diagram of the transmit section of FIGS. 6 and 9.

A detailed circuit diagram of the transmitter section 122 of interface 92 is given in FIG. 10. The pulse converter is simply a pair of equal value resistors 260,262 (R101, R102, here 2 Kohm), connected to the outputs of two digital devices 264,266 (U101, U102, here standard CMOS binary logic with logic levels of 0 and 5 volts). When no signal is present (signal zero) one input (XP) is high (+5 v) and the other is low (0 v) since one signal (TXN) is inverted. As a result the transmit signal (TX) has a zero signal level or voltage offset of half logic level (+2.5 volts). When a positive pulse is to be transmitted, a logic level pulse of the desired width (e.g. 1 μs) is applied to the TXP input, resulting in a change of the TX output to full logic level (+5.0 v). If instead a logic level pulse is applied to the TXN input and is inverted, the TX output goes to 0 volts. Thus, with respect to the zero signal voltage, a TXP input produces a positive pulse of half logic unit (+2.5 v) at the TX output and a TXN input produces a negative pulse (−2.5 v) at the converter output (if unloaded). The output (Thevenin) impedance from this network is half the resistor value (here 1 Kohm).

The transmit signal (TX) is then coupled through a capacitor 270 to the next stage 272 (U103). The capacitor 270 removes the DC level so that the TX signal at the amplifier output is positive and negative with respect to ground. A maximum gain of 0.5 is desired here to avoid overloading the next stages and is accomplished by making the feedback resistor 274 (R103) half that of the driving impedance (that is, R103=0.5 Kohm).

Between the pulse converter and the amplifier is the TX-LEVEL digital potentiometer 280 (RP3). Here it has the range of 0 to 10 Kohm, which is added to the internal impedance. As the resistance is increased the transmit signal voltage level (TX) decreases. The range of adjustment the TX voltage is 1.25 v peak (2.5 vpp) to 0.12 v peak at the amplifier unit 264,266 (U101 and U102). In addition, there is an auxiliary transmit input for externally generated signals of other formats (e.g. Mitel). Also the amplifier 272 has a unity gain analog inverter to produce the proper signal into the current driver with the required inverted signal output. This inverter should have minimal propagation delay and a wide frequency response so that the inverted and non-inverted current driver outputs are closely matched, except for the inversion. While digital potentiometer 280 is shown by way of example, other devices can be employed.

The current drivers are used to allow the option of a balanced drive with respect to ground (non-inverted signal on one side and inverted signal on the other). This is needed for the impedance load option but is not necessary with a proper transformer. Since the dual drivers will work with nearly any interface, they provide flexibility. Analog drivers are needed because the transmit voltage level is adjustable, as required to adapt to the difference voltage requirements of different digital telephones. By contrast, standard digital drivers have fixed voltage outputs. While either a voltage or current type driver can be used, the current type driver is more flexible in adapting to a variety of line interfaces. Also the output voltage requirements are less, since there is no series output or line matching resistance, a desirable characteristic because of the cost of higher voltage, higher frequency amplifiers. Furthermore the constant current driver would be desirable if dynamic line impedance matching were needed.

The constant current drivers 284,286 (U105, U106) are identical. Only one of the input signal voltages is inverted by inverter 290 (U104). The circuit is a modification of a conventional constant current driver found in electrical engineer texts. The current source is deliberately made non-ideal (equivalent shunt resistor in parallel with current generator) so that any DC offset will not charge the output capacitor, if used. This is done by making the negative feedback voltage divide ratio 294/296 (R111/R112). Alternatively the DC feedback compensation provided by resistor 300 and capacitor 302 (R118, C103) may be used. The circuit for the transmit section of interface 94 is identical to that shown in FIG. 10 except that the outputs I$^+$ and I$^-$ go to set 70' rather than to PBX 50'.

Figure 11:
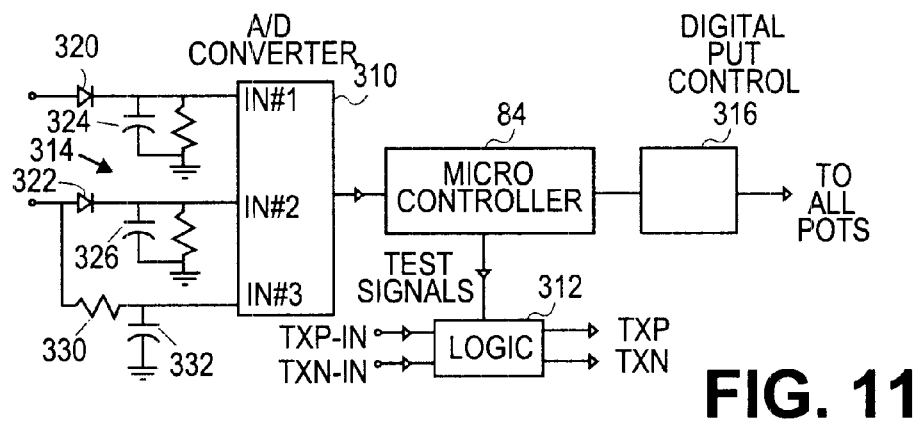
FIG. 11 is a schematic block diagram illustrating the microcontroller portion of the universal interface of the present invention.

The manner in which microcontroller 84 is operatively connected to interface 82 is shown in further detail in FIG. 11. As previously described, microcontroller 84 under program control changes operational parameters in interface 82 as a function of electrical characteristics of the particular type of PBX to which interface 82 is connected. In particular, microcontroller 84 controls the circuit adjustments in the circuits of FIGS. 8 and 10 and on both the PBX side and the set side. Microcontroller 84 has analog inputs so that the external receiver amplitude and null signals can be sensed. The microcontroller 84 and analog signal monitor section includes microcontroller/microprocessor 84 with analog/digital converter (A/D) 310, digital signal logic 312, analog signal averager 314, and digital potentiometer driver 316. The microcontroller 84, through the A/D 310 monitors the signal levels and periodically adjusts the digital potentiometers or like devices in the circuits of FIGS. 8 and 10 and on both the PBX side and set side. In particular, with a complete system including four interface circuits, A/D 310 monitors six voltages and microcontroller 84 controls eight digital potentiometers or like devices.

In a computer telephone system the microcontroller 84 is primarily concerned with other functions and the signal level adjustment need be made only upon power-up or when the microcontroller has free time. The digital potentiometer driver 316, which is a serial data line communication type, alternatively may be internal to the microcontroller 84. Analog signals which are monitored are the peak null voltages, averaged over 10 to 1000 periods, peak signal level, averaged, and zero offset voltage. Diodes 320,322 in signal averager 314 allow the peak AC signals to charge capacitors 324,326. The capacitors 324,326 are slowly discharged, providing a time averaging. For the DC signal (zero offset), a simple RC low pass filter 330,332 is used to remove the AC signal components, leaving only the baseline voltage.

Initially the ZERO pot 236 (RP1) is adjusted to the desired offset value (e.g. +2.0 v or +1.6 v). Then the signal level is measured with a received signal from an external source only. This may be used to characterize the external transmitter, set the receiver threshold, and chose the transmitter signal level. The purpose of the digital signal logic 312 is to provide the proper logic signals to the transmitter (TXP and TXN), to disable the signals for testing, to provide a test signal when needed for the null adjustment process, and to provide a slightly delayed transmit signal (TNULL) for the null section.. This logic is best implemented by a programmable logic device but could be done by a digital signal processor, individual logic devices, or a custom device.

Figure 12:
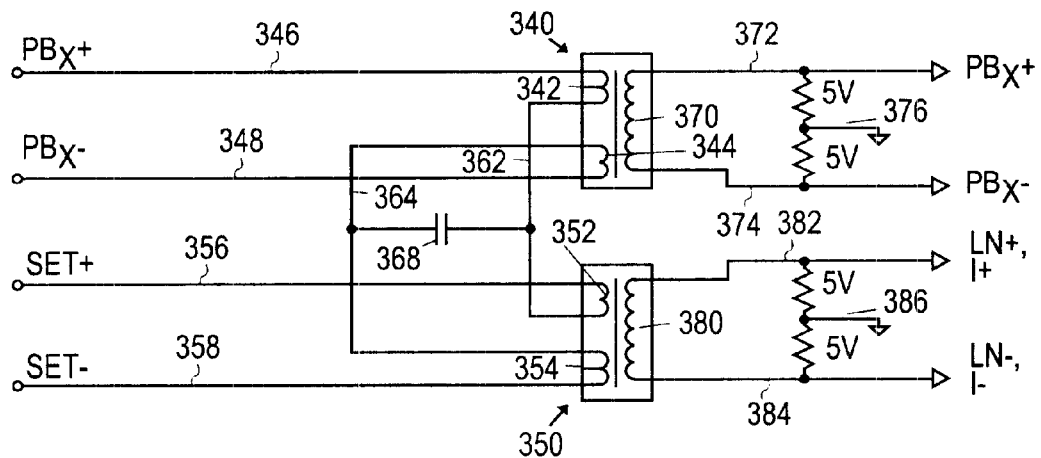
FIG. 12 is a schematic diagram illustrating a form of coupling between the interface and the telephone line.

FIG. 12 illustrates a transformer type arrangement for coupling the digital telephone line on both the set side and the PBX side. There are two analog interface circuits of the type shown in FIG. 6 for a complete system, one for the set side and the other for the PBX side. Thus, the circuits of FIGS. 7 and 9 are duplicated. In the arrangement of FIG. 12, a first transformer 340 has windings 342 and 344 connected to the positive and negative terminals of the PBX by lines 346 and 348, respectively. A second transformer 350 has windings 352 and 354 connected to the positive and negative terminals of the telephone set via lines 356 and 358, respectively. Windings 342 and 352 are connected by line 362, windings 344 and 354 are connected by line 364 and lines 362 and 364 are coupled by a capacitor 368. Transformer 340 has a winding 370 coupled to windings 342, 344 and connected by lines 372 and 374 to a resistive rollage divider 376. Lines 372 and 374 also are connected to lines 124 and 126, respectively, in the analog interface circuit of FIG. 6 provided for the PBX side as previously described. Similarly transformer 350 has a winding 380 coupled to windings 352, 354 and connected by lines 382 and 384 to a resistive voltage divider 386. Lines 382 and 384 also are connected to lines 124 and 126, respectively, in the analog interface circuit of FIG. 6 provided for the set side as previously described.

Under some conditions there is an advantage to adjusting the line impedance to a specific value. For conventional duplexers, there are two adverse consequences of line impedance mismatch. One is that the null is disturbed and thus the transmitted signal leaks through, and interferes with the externally received signal. The automatic nulling of the interface of the present invention prevents this even if an impedance mismatch occurs. For this reason, accurate impedance matching normally is not needed because nominal matching (100 ohms) is adequate.

The other consequence of mismatch is the signal reflection or echo. For a long transmission line, a pulse transmitted from one end is partially reflected from the other end if it is not terminated in a impedance equal to the line impedance. The amplitude of the reflected signal increases with the degree of mismatch and the time delay of the signal increases with the line length. Thus a mismatch at one end will cause a problem at the other end because the receiver sees its own transmit signal. For short lines, where the delay is short, the automatic null provided by the interface of the present invention will take care of this, but for a long delay the null signal will not match and the null will be ineffective.

Figure 13:
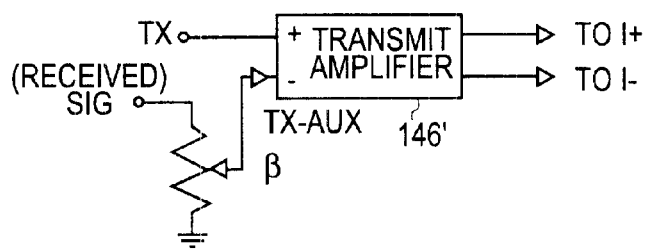
FIG. 13 is a schematic block diagram illustrating a dynamic line impedance matching method.
Figure 14:
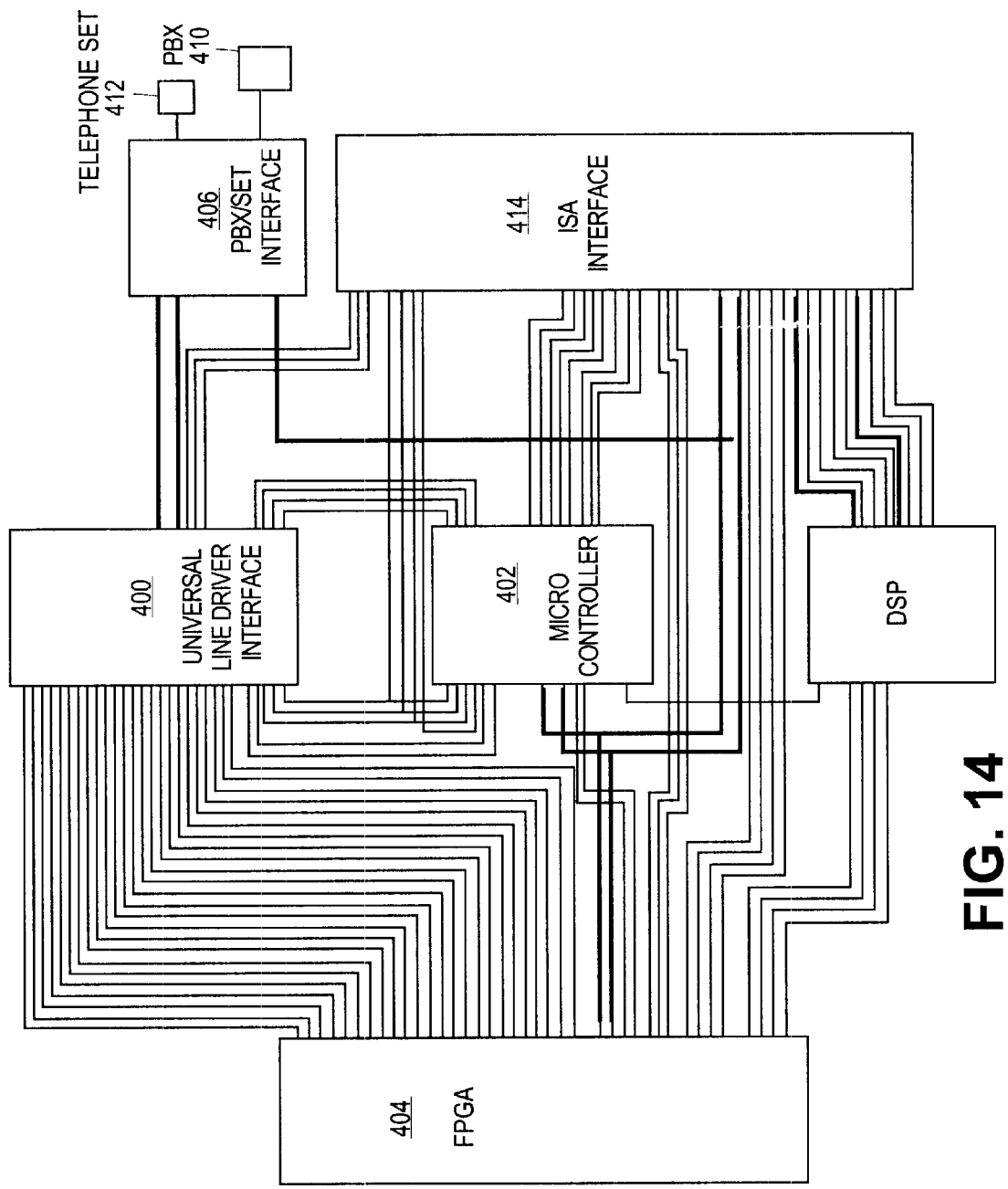
FIG. 14 is a block diagram illustrating a universal interface according to another embodiment of the present invention.

FIG. 13 illustrates a dynamic line impedance matching method according to the present invention for long line/long delay situations. A portion (β) of the received signal, determined by the setting of potentiometer, is fed back to the transmitter, i.e. to the TX-AUX input of transmitting amplifier 146' (negative feedback). As discussed in standard tests, this will reduce the line impedance ($Z_L$) according to this relation:

$$Z_L = \frac{Z_O}{1 + 1/\beta}$$

where $Z_O$ is the line impedance without feedback.

FIGS. 14–18 illustrate a universal interface according to a preferred mode of the present invention. The system of FIGS. 14–18 includes a universal line driver interface 400, microcontroller 402 and network interface or field programmable gate array 404. A relay logic component 406 provides a PBX/set interface. In particular, component 406 determines whether PBX 410 and telephone set 412 are connected to universal line driver interface 400 or set 412 and PBX 410 are connected in a manner bypassing interface 400. An ISA interface component 414 provides a host interface to a personal computer (not shown).

Figure 15:
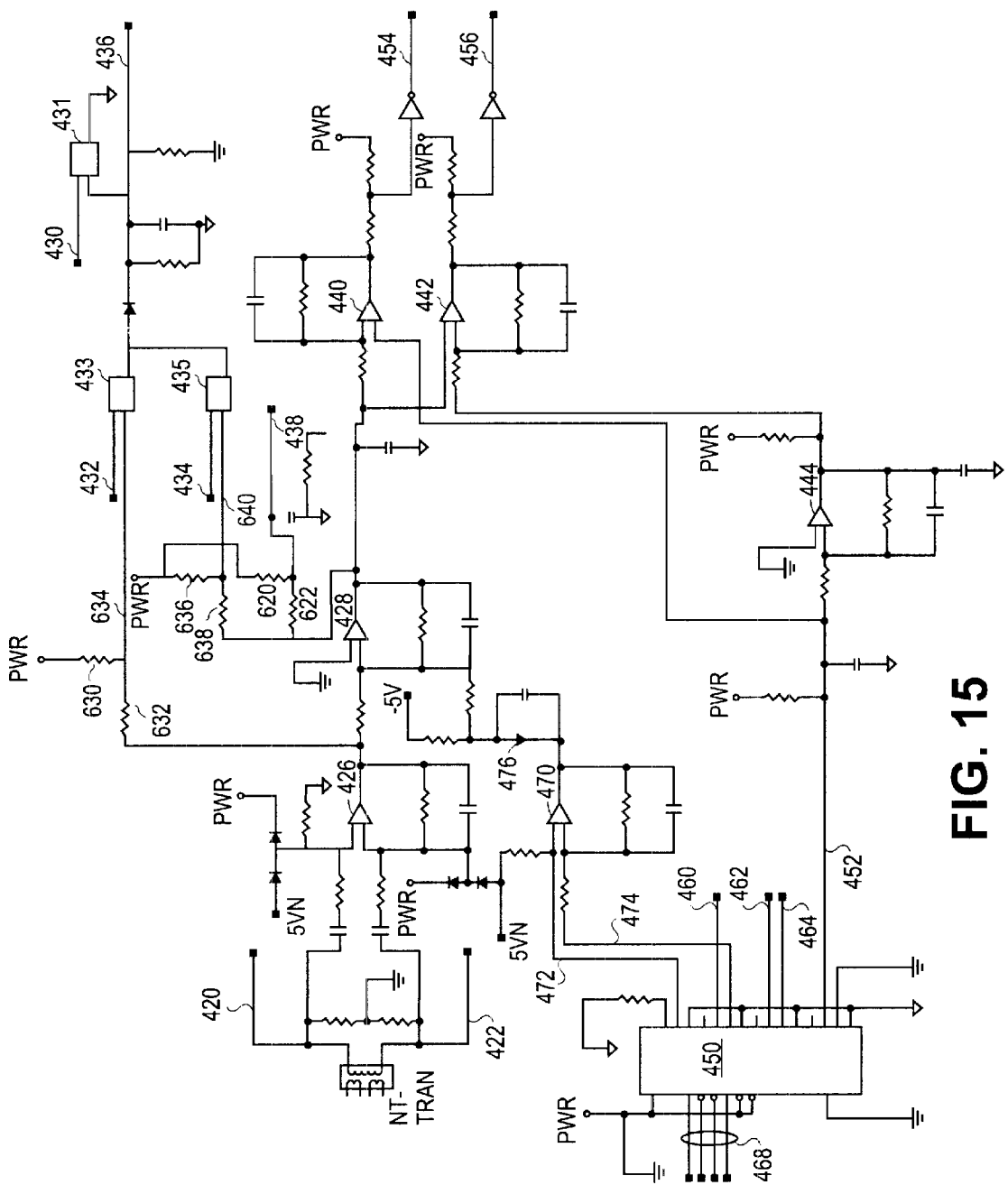
FIG. 15 is a schematic circuit diagram of the receiver and nulling section of the interface of FIG. 14 on the PBX side.

As in the embodiment of FIGS. 4–11, universal line driver interface 400 includes a transmit interface and a receiver interface for both the PBX side and the set side. The receiver interface for the PBX side is shown in FIG. 15. Lines 420 and 422 connect the receiver interface for the PBX side (shown in FIG. 16) in a manner similar to that of the balanced line pair shown and described in connection with FIG. 6. The input stage includes differential amplifier 426 corresponding to amplifier 130 of FIGS. 6 and 7 and amplifier 170 of FIG. 8. The nulling section includes amplifier 428 corresponding to amplifier 134 of FIGS. 6 and 7 and amplifier 186 of FIG. 8. Lines 430, 432 and 434 connect analog switches 431, 433 and 435, respectively, of the circuit of FIG. 15 to network interface 404, and lines 436 and 438 connect corresponding portions of the circuit to microcontroller 402.

The comparator stage includes comparators 440 and 442 corresponding to comparators 136 and 138 of FIGS. 6 and 7 and comparators 194 and 196 of FIG. 8. Comparator threshold adjustment is provided by the portion of the circuit of FIG. 15 including inverting amplifier 444 corresponding to inverting amplifier 214 in the circuit of FIG. 8. The threshold adjustment is under control of a digital potentiometer as in the circuit of FIG. 8, and in the circuit shown in FIG. 15 a quad-type digital potentiometer 450 is provided and is connected via line 452 to the threshold adjustment portion of the circuit. The comparator outputs are connected by lines 454 and 456 to network interface 404. Digital potentiometer 450 is connected by lines 460 and 462 to network interface 404 and is connected by line 464 to the transmitter interface for the PBX side (shown in FIG. 16). Lines collectively designated 468 in FIG. 15 show connections between digital potentiometer 450 and microcontroller 402. Amplifier 470 in the circuit of FIG. 15 performs functions similar to those of TX-NULL amplifier 218 in the circuit of FIG. 8. Control signals from digital potentiometer 450 are applied to the inputs of amplifier 470 via lines 472 and 474. The output of amplifier 470 is provided to the nulling section, and zener diode 476 in the circuit of FIG. 15 functions similar to zener diode 248 in the circuit of FIG. 8.

Figure 16:
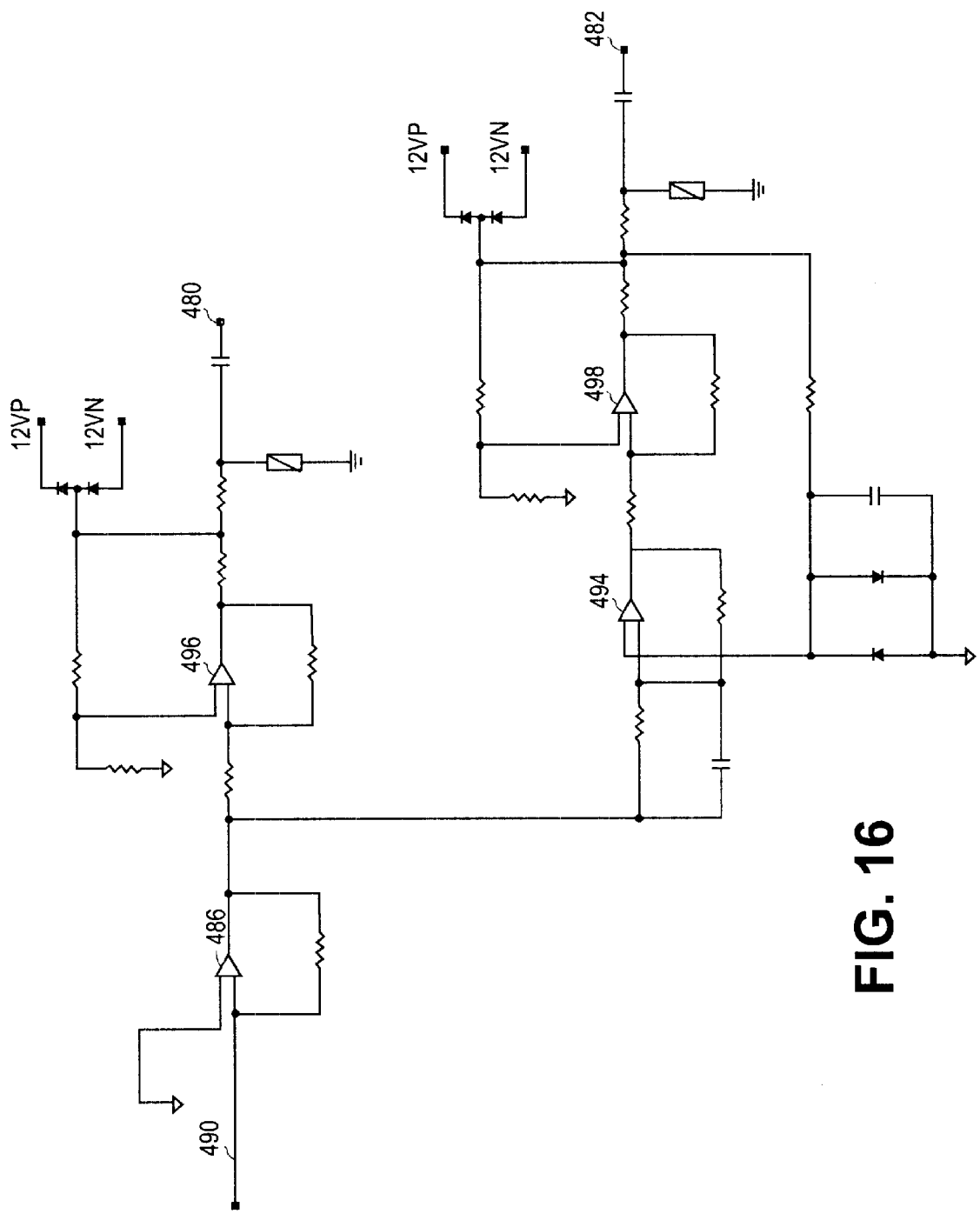
FIG. 16 is a schematic circuit diagram of the transmitter section of the interface of FIG. 14 on the PBX side.

The transmitter interface for the PBX side is shown in FIG. 16. Lines 480 and 482 connect the transmitter interface to lines 420 and 422, respectively, of the receiver interface circuit of FIG. 15 as previously described and in manner similar to that of the balanced line pair shown and described in connection with FIG. 6. Amplifier 486 corresponds to transmit amplifier 146 of FIG. 9 and amplifier 272 in the circuit of FIG. 10. TX-LEVEL is controlled by a signal on line 490 connected to line 464 from digital potentiometer 450 in the circuit of FIG. 15. Inverter 494 in the circuit of FIG. 16 corresponds to inverter 290 in the circuit of FIG. 10, and current drivers 496 and 498 correspond to current drivers 284 and 286 in the circuit of FIG. 10.

Figure 17:
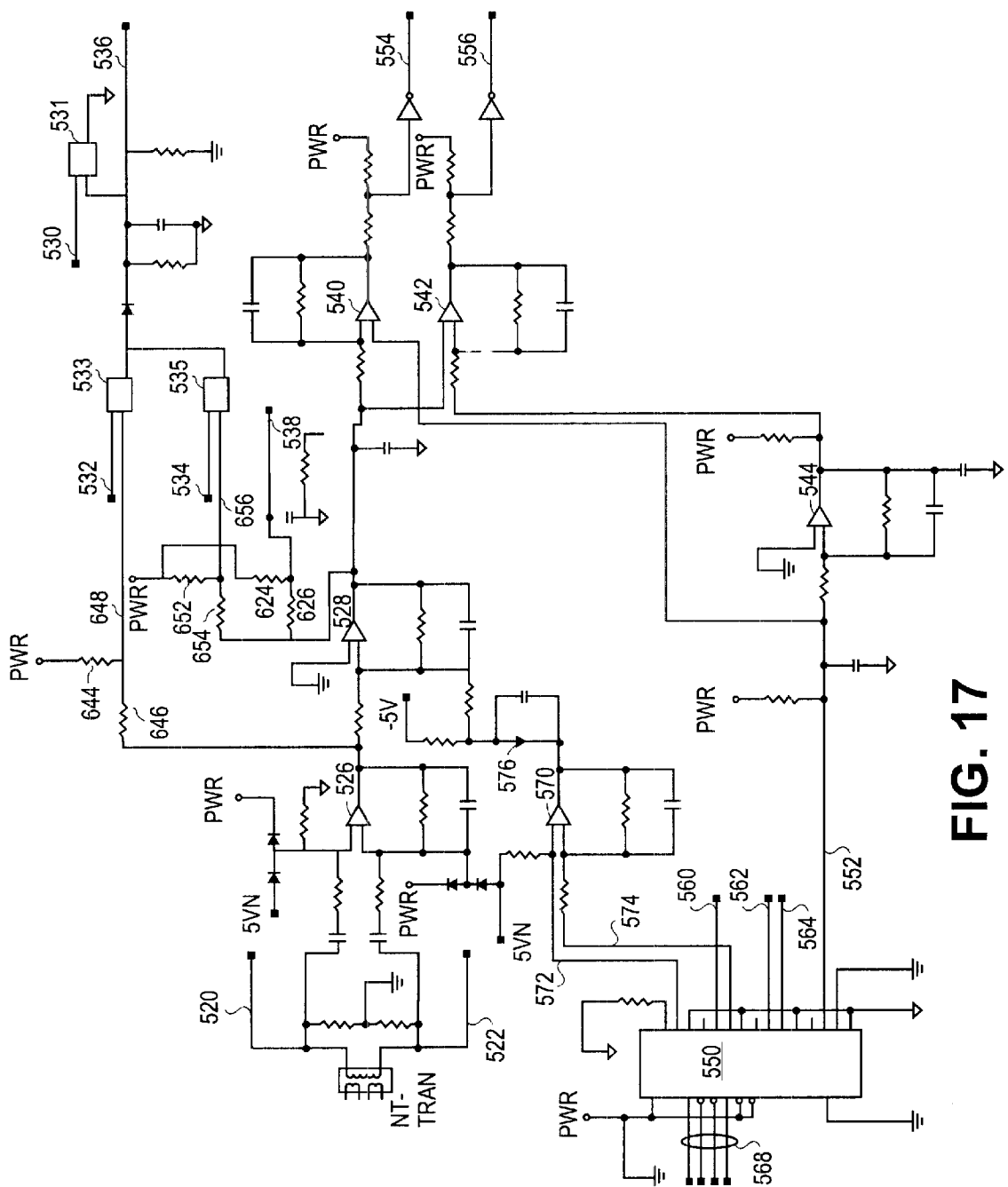
FIG. 17 is a schematic circuit diagram of the receiver and nulling section of the interface of FIG. 14 on the set side.

The receiver interface for the set side is shown in FIG. 17. Lines 520 and 522 connect the receiver interface for the set side to the transmitter interface for the set side (shown in FIG. 18) in a manner similar to that of the balanced line pair shown and described in connection with FIG. 6. The input stage includes a differential amplifier 526 similar to amplifier 426 in FIG. 15. The nulling section includes amplifier 528 similar to amplifier 428 in FIG. 15. Lines 530, 532 and 534 connect portions of the circuit of FIG. 17 to network interface 404 and line 536 connects a portion of the circuit of FIG. 17 to microcontroller 402.

The comparator stage includes comparators 540 and 542 similar to comparators 440 and 442 in the circuit of FIG. 15. Comparator threshold adjustment is provided by the portion of the circuit of FIG. 17 including inverting amplifier 544 similar to inverting amplifier 440 in the circuit of FIG. 15. The threshold adjustment is under control of a quad-type digital potentiometer 550 similar to digital potentiometer 450 in the circuit of FIG. 15. Line 552 connects potentiometer 550 to the threshold adjustment portion of the circuit. The comparator outputs are connected by lines 554 and 556 to network interface 404. Digital potentiometer 550 is connected by lines 560 and 562 to network interface 404 and is connected by line 564 to the transmitter interface for the set side (shown in FIG. 18). Lines collectively designated 568 in FIG. 17 show connection between digital potentiometer 550 and microcontroller 402. Amplifier 570 in the circuit of FIG. 17 performs functions similar to those of amplifier 470 in the circuit of FIG. 15. Control signals from digital potentiometer 550 are applied to the inputs of amplifier 570 by lines 572 and 574. The output of amplifier 570 is provided to the nulling section, and zener diode 576 is similar to zener diode 476 in the circuit of FIG. 15.

Figure 18:
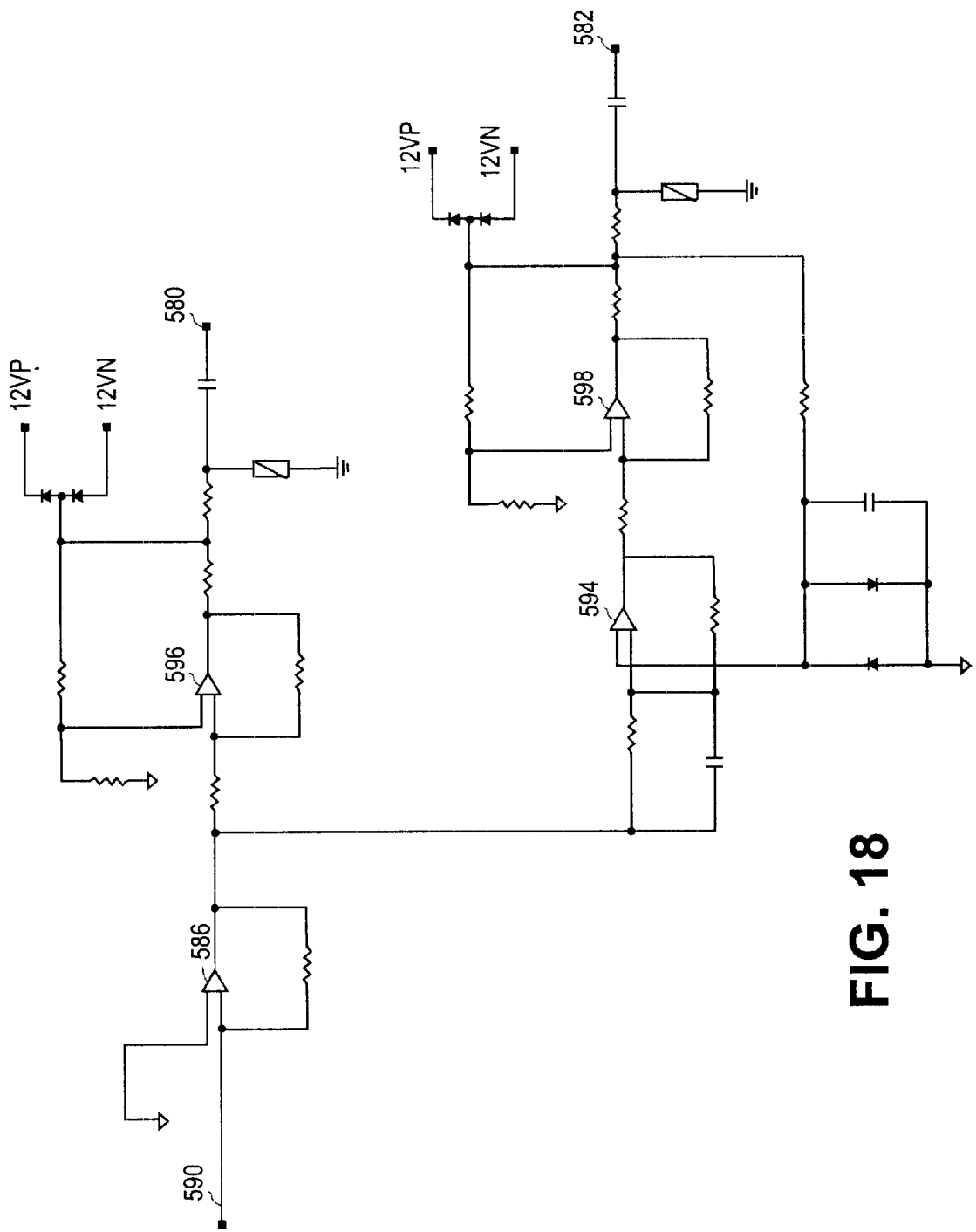
FIG. 18 is a schematic circuit diagram of the transmitter section of the interface of FIG. 14 on the set side.

The transmitter interface for the set side is shown in FIG. 18. Lines 580 and 582 connect the transmitter interface to lines 520 and 522, respectively, of the receiver interface circuit of FIG. 17 as previously described and in a manner similar to that of the balanced line pair shown and described in connection with FIG. 6. Amplifier 586 is similar to amplifier 486 in FIG. 16, and TX-LEVEL is controlled by a signal on line 590 connected to line 564 from digital potentiometer 550 in the circuit of FIG. 17. Inverter 594 in the circuit of FIG. 18 is similar to inverter 494 in the circuit of FIG. 16, and current drivers 596 and 598 are similar to current drivers 496 and 498 in the circuit of FIG. 16. Alternative devices can of course be substituted for the digital potentiometers in the circuits of the system of FIGS. 14–18.

The algorithm for adjusting the digital potentiometers (pots) in the system of FIGS. 14–18 is as follows. The system of FIGS. 14–18 is designed to provide an interface to PBXs from several manufacturers. The circuitry includes eight digital pots (four in each of the quads 450 and 550) and eight analog to digital converters (ADC's) that are used to adjust the circuit and measure signal so that critical circuit parameters can be adjusted to accommodate the various PBX transmission protocols and compensate for component tolerances. In addition, because the adjustment is performed on a live circuit from the PBX and telephone handset, circuit loop length can be compensated for. This provides a very robust method of providing error free operation.

The circuit provides a separate interface to the PBX and the desktop handset, converting from the various proprietary methods that the PBX manufacturers use to communicate with their equipment to a raw digital stream that is fed into the PBX specific (Field Programmable Gate Array (FPGA) to be further decoded into a true digital bitstream.

The overall concept is to bias the input signal to about 2.5 volts (providing a virtual ground for the signal of 2.5V), determining the voltage swing of the signal and calculate threshold values to isolate the maximum and minimum going peaks relative to virtual ground. From this, the upper and lower signal thresholds that are used for level detection are calculated. Also, some of the PBX systems superimpose the transmitted signal on the received signal so that the transmitted a signal needs to be subtracted out before the received signal is decoded. This part of the circuit is called NULL calibration.

In the following description the capitalized word SET will be used to denote things relating to the telephone handset and the word "Set" or "set" will be the usual English word meaning "to change the value of' of" to affect a change on."

The eight digital pots in the circuit of FIGS. 14–18 provide the following functions:

| | |
|---|---|
| 1-PBX NULL | Adjust the amplitude of the transmit signal that is subtracted from the signal stream. |
| 2-PBX Tx Level | Set the transmit level to the PBX. |
| 3-PBX Threshold | Adjust the offset from virtual ground of the +/− threshold for sensing the receive signal. |
| 4-SET zero level | Adjusts the bias that is added to the input signal to set the virtual ground. |
| 5-SET NULL | Adjust the amplitude of the transmit signal that is subtracted from the signal stream. |
| 6-SET Tx Level | Set the transmit level to the PBX. |
| 7-SET Threshold | Adjusts the offset from virtual ground of the +/− threshold for sensing the receive signal. |

There are eight ADCs that will measure various signals in the circuit. In addition, there are four analog switches that allow more than one signal to be measured on each ADC channel. The ADC's perform the following functions:

| | |
|---|---|
| 0-PBX zero level | Measures the actual zero level set by Pot 0. |
| 1-PBX peak detect | Measures the peak value of the PBX receive or PBX transmit signal. |
| 2-SET zero level | Measures the actual zero level set by Pot 4. |
| 3-SET peak detect | Measures the peak value of the SET receive or SET transmit signal. |
| 4-PBX threshold+ | Measures the upper threshold that had been set by pot 3 |
| 5-PBX threshold− | Measures the lower threshold that has been set by pot 3 |
| 6-SET threshold+ | Measures the upper threshold that has been set by pot 7 |
| 7-SET threshold− | Measures the lower threshold that has been set by pot 7 |

The PBX and SET peak detect ADC channels have an analog switch that allows them to be used to measure either the transmit signal or the receive signal. This is done by setting or clearing the RS_SEL control bit on lines 432 and 434 in the circuit of FIG. 15 and on lines 532 and 534 in the circuit of FIG. 17. The PBX and SET peak detect ADC channels have circuitry associated with them to hold the peak value over an interval so that it can be read later by the ADC. This peak detector is cleared by setting the PV_CLR control bit on lines 430 and 530 in the circuits of FIGS. 15 and 17, respectively, which controls an analog switch which allows the peak detector to drain to ground. The RC constant of this circuit is approximately 10 ms so PV_CLR should be held high for at least that long to clear the detector. PV_CLR should be held low for a time sufficient to register a valid peak.

Setting signal detection characteristics is accomplished by the algorithm for setting the Pots in order to optimize performance which is as follows:

1. Set the Zero Level Pot in order to set the bias at 2.5 V. The initial value for this pot will be supplied by a table.
2. Read the Zero Level ADC channel to determine if the actual bias voltage is 2.5 v.
3. Adjust the zero level pot until 2.5 v is seen at the zero level ADC. Call this zero value VZ.
4. Read the peak detect ADC channel to determine the maximum value of the input signal. Call this value $V_{peak+}$.
5. Set the threshold pot so that the threshold is 60% of the peak relative to the zero value. This corresponds to $$\text{threshold} = 0.6 \times (V_{peak+} - V_z) + V_z$$
$$= 0.6 \times V_{peak+} - 0.6 \times V_z + V_z$$
$$= 0.6 \times V_{peak+} - 0.4 \times V_z$$

6. Read the threshold+ pot. Call this $V_{thresh+}$.
7. Read the threshold pot. Call this $V_{thresh-}$.
8. Read the value of the Zero Level Pot so that the Zero Level Voltage read by the zero level ADC channel is:

$$\text{zero level} = \frac{V_{threst+} + V_{thresh-}}{2}$$

This is done so that the virtual ground is centered between the threshold and is done though measurement rather than calculation to ensure that component tolerances are properly compensated for.

The following illustrates calculations to determine nominal POTS settings and ADC readings. The meaning of the POTS settings and interpretation of the ADC readings is based on various circuit parameters. The following will describe the parameters for each POT and ADC to provide meaning for the values from a software point of view.

The Zero Level ADC channels have associated with them a resistor network comprising the series combination of a 1 M resistor and a 100K resistor with the junction of the resistors connected to Zv ADC Channel, the 1 M resistor connected to the 5 volt supply and the 1 M resistor connected to a point in the circuit at 2.5 volts. Such a network is included in the circuit of FIG. 15 wherein resistors 620 and 622 are connected in series between a 5 volt power terminal and a point in the circuit where a 2.5 volt signal level is present and wherein the junction of the resistors 620 and 622 is connected by line 438 to the Zv ADC channel provided by microcontroller 402. A similar network is included in the circuit of FIG. 17 wherein the junction of resistors 624 and 626 is connected by line 538 to microcontroller 402.

The zero level pot is to be adjusted such the zero level ADC indicates 2.5 volts.

$$\text{Voltage at } ADC = 2.5 + (5.0 - 2.5)1.0 \times \frac{10^5}{1.1 \times 10^6}$$

$$= 2.5 + \frac{2.5}{11}$$

$$= 2.5 + 0.2273$$

$$= 2.7273$$

This corresponds to a ADC value of 0×8c which is the POT value in hexadecimal.

The Peak Detect ADC channels have associated with them a resistor network comprising the series combination of a 4.7 K resistor and an 820 ohm resistor with the junction of the resistors connected to the peak detect ADC channel, the 4.7K resistor connected to the 5 volt supply and the 820 ohm resistor connected to a point in the circuit wherein the voltage at the peak detector is present. One such network in the circuit of FIG. 15 includes the series combination of resistors 630 and 632 wherein the junction of the resistors is connected by line 634 to analog switch 433. Another such network includes the series combination of resistors 636 and 638 wherein the junction of the resistors is connected by line 640 to analog switch 435. Similar networks are included in the circuit of FIG. 17 wherein the junction of resistors 644 and 646 is connected by line 648 to analog switch 533 and the junction of resistors 652 and 654 is connected by line 656 to analog switch 535.

In this case we want to solve for the Voltage at the peak detector $V_p$, given that we will read the peak level ADC and want to know $V_p$.

$$V_{adc} = V_p + (5.0 - V_p)\frac{820}{4700 + 820}$$

$$V_{adc} = V_p + (5.0 - V_p)\frac{820}{5520}$$

$$V_{adc} = V_p + \frac{820 \times 5.0 - 820 \times V_p}{5520}$$

$$V_{adc} = \frac{4700}{5520}V_p = \frac{4100}{5520}$$

$$V_{adc} = \frac{4100}{5520} + \frac{4700}{5520}V_p$$

$$\frac{5520}{4700}V_{adc} - \frac{4100}{4700} = V_p$$

$$1.1744 \times V_{adc} - 0.8723 = V_p$$

The threshold POT has associated with it a resistor network comprising the series combination of a 5K resistor, a 10K resistor and a 15K resistor with the 10K resistor being connected between the other two, the 5K resistor being connected to the 5 volt supply and the 15K resistor being connected to ground. The threshold voltage is taken off the 10K resistor. A voltage Va is present at the junction between the 5K resistor and the 10K resistor, and a voltage Vb is present at the junction between the 10K resistor and the 15K resistor.

The range of the POT is governed by $V_a$ and $V_b$, which are calculated as follows:

$$V_a = \frac{10 + 15}{30} \times 5.0 \text{ V} \quad V_b = \frac{15}{30} \times 5.0 \text{ V}$$

$$V_a = \frac{25}{30} \times 5.0 \text{ V} \quad V_b = 2.5 \text{ V}$$

$$V_a = 4.1667 \text{ V}$$

Thus, the voltage swing for the threshold voltage is 3.5V to 4.1667V

Table I presents illustrative values for calculating the threshold POT value need to set the threshold for the circuits. The operation requires that the peak detector be read. The raw value is in the Column labeled "Peak detector ADC value". The next column is the peak voltage that the ADC value represents. The next column is the desired threshold voltage. The column label "POT value" calculates the value that is needed by the POT to obtain the desired threshold and the following column converts it to hex so can be cut and pasted into a C sources file. The Vs, R1 and R2 values are taken from the circuit, and the percentage can be varied depending on desired levels.

TABLE I

| Peak detector ADC value | Vs 5.0 Voltage it represents | R1 4700 Desired Threshold | R2 820 POT Value | Threshold 60% POT Value In Hex |
|---|---|---|---|---|
| 0 | −0.8723 | 0.4766 | −311 | 0x00, |
| 1 | −0.8494 | 0.4904 | −309 | 0x00, |
| 2 | −0.8265 | 0.5041 | −307 | 0x00, |
| 3 | −0.8035 | 0.5179 | −304 | 0x00, |
| 4 | −0.7806 | 0.5316 | −302 | 0x00, |
| 5 | −0.7576 | 0.5454 | −300 | 0x00, |
| 6 | −0.7347 | 0.5592 | −298 | 0x00, |
| 7 | −0.7118 | 0.5729 | −296 | 0x00, |
| 8 | −0.6888 | 0.5867 | −294 | 0x00, |
| 9 | −0.6659 | 0.6005 | −292 | 0x00, |
| 10 | −0.6430 | 0.6142 | −290 | 0x00, |
| 15 | −0.5283 | 0.6830 | −279 | 0x00, |
| 20 | −0.4136 | 0.7519 | −269 | 0x00, |
| 30 | −0.1842 | 0.8895 | −247 | 0x00, |
| 50 | −0.2746 | 1.1648 | −205 | 0x00, |
| 100 | 1.4215 | 1.8529 | −99 | 0x00, |
| 150 | 2.5685 | 2.5411 | 6 | 0x06, |
| 200 | 3.7154 | 3.2293 | 112 | 0x70, |
| 250 | 4.8624 | 3.9174 | 218 | 0xDA |

Figure 19:
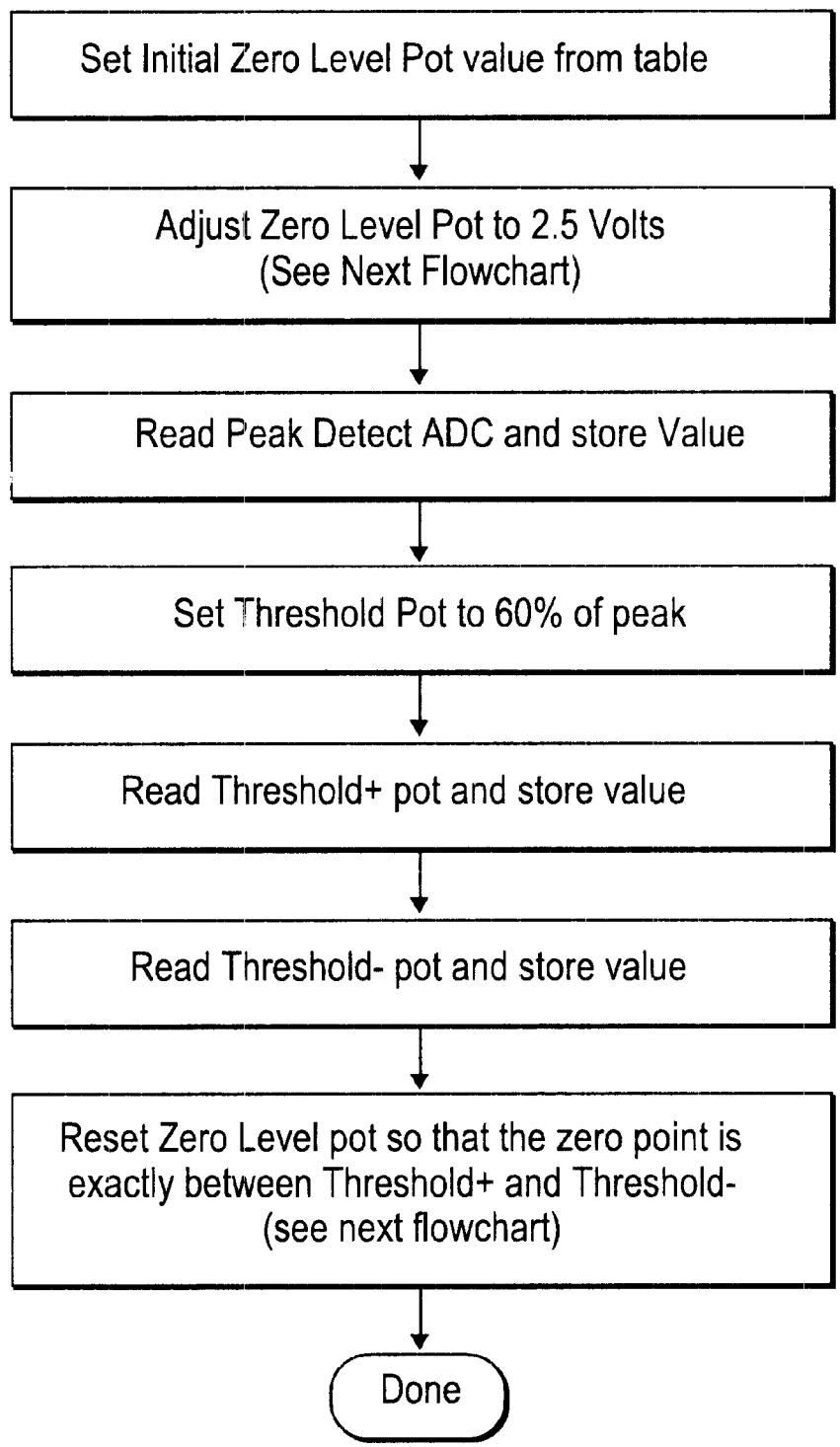
FIGS. 19 and 20 are flow charts illustrating the method for adjusting the digital potentiometers in the circuits of FIGS. 15 and 17.
Figure 20:
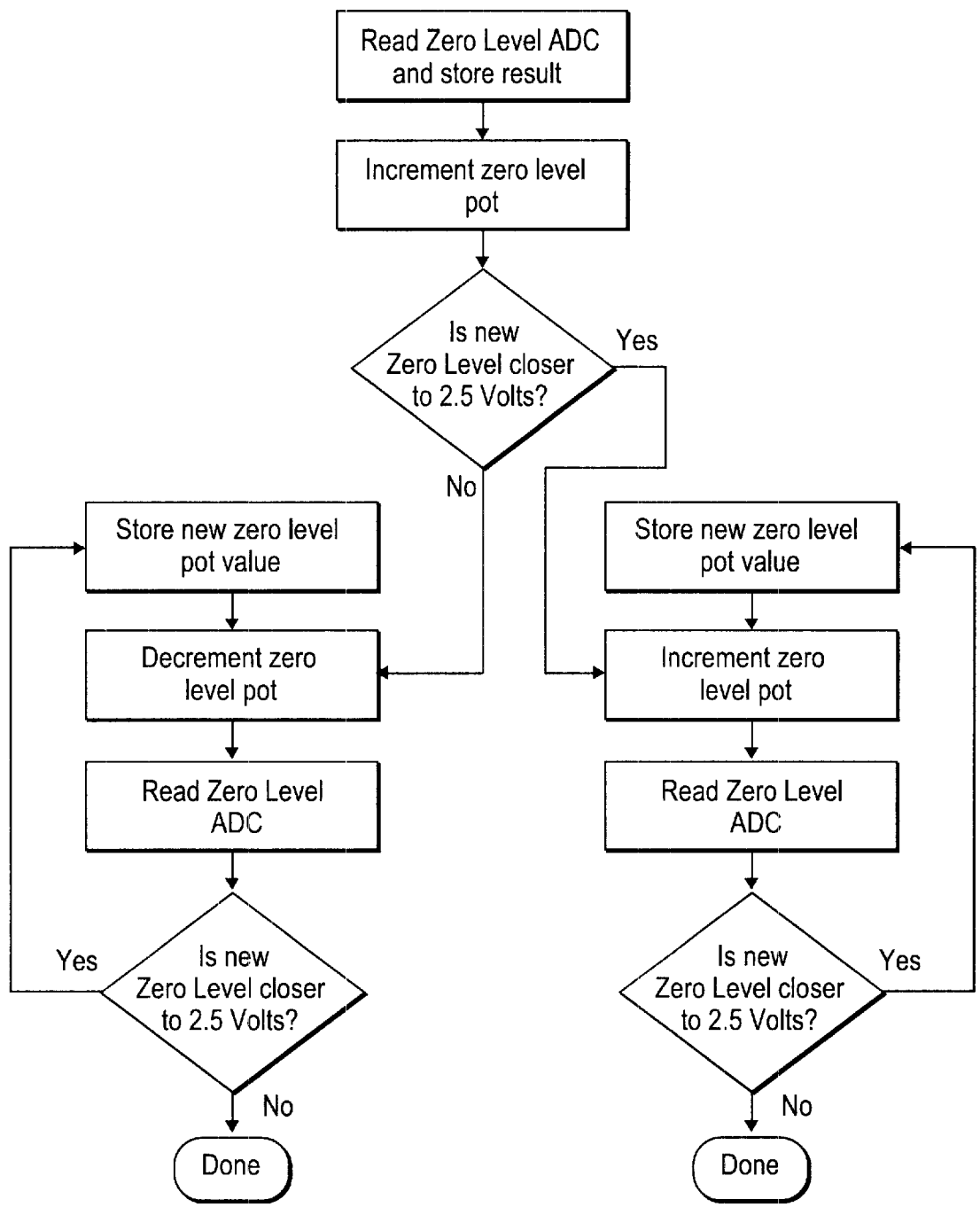

The flow charts of FIGS. 19 and 20 illustrate the method for adjusting the PBX and SET digital pots 450 and 550, respectively, in the circuits of FIGS. 15 and 17, respectively.

It is therefore apparent that the present invention accomplishes its intended objects. While embodiments of the present invention have been described in detail, that has been done for purposes of illustration, not limitation.

What is claimed is:

1. A computer telephony system comprising:

a computer including a controller;

a computer telephony interface coupled to the computer;

a line driver interface coupled to the computer telephony interface;

a private branch exchange (PBX) coupled to the line driver interface; and a digital telephone set coupled to the line driver interface;

the line driver interface including:

network interface logic; and a universal line driver/receiver (ULDR), coupled to the network interface logic, the PBX and the digital telephone set, to automatically configure the network interface logic, the ULDR to adapt to different transmission and reception voltage levels and to match various telephone line impedances, and wherein the controller of the computer is coupled to the network interface logic and the ULDR, to change, via programming, operational parameters of the ULDR based upon the type of PBX coupled to the ULDR and to monitor and adjust signal levels of signals in the ULDR.

2. A system according to claim 1, wherein the ULDR includes a first transmit/receive interface section coupled to the PBX and a second transmit/receive interface section coupled to the telephone set.

3. A system according to claim 2, wherein the first and second transmit/receive interface sections include analog duplexer means for separating transmitted and received signals.

4. A system according to claim 2, wherein the first and second transmit/receive interface sections include a receiver portion and a transmitter portion.

5. A system according to claim 4, wherein the receiver portion includes nulling circuit means to null a transmitting signal in the receiver portion.

6. A system according to claim 2, wherein the programmed controller monitors analog signals in the first and second transmit/receive interface sections.

7. A system according to claim 6, wherein the analog signals in the first and second transmit/receive interface sections include peak null voltages, peak signal levels and averaged and offset voltages.

8. A system according to claim 4, wherein the receiver portion includes comparators that have threshold voltages that are adjusted by the programmed controller.

9. A system according to claim 4, wherein the programmed controller adjusts transmit signal levels in the transmitter portions.

10. A system according to claim 4, wherein the receiver portion includes a digital potentiometer means for controlling signal levels therein.

11. A system according to claim 10, wherein the programmed controller adjusts the digital potentiometer means.

12. A system according to claim 4, wherein the transmitter portion includes:
impedance feedback compensation means; and
current driver means converted to the output of the impedance feedback compensation means for providing a balanced transmitting signal source.

13. A computer telephony system comprising:
a computer including a controller;
a computer telephony interface coupled to the computer;
a line driver interface coupled to the computer telephony interface; and
a private branch exchange (PBX) coupled to the line driver interface;
the line driver interface including:
a network interface logic; and
a universal line driver/receiver (ULDR), coupled to the network interface logic and the PBX, to automatically configure the network interface logic; and
wherein the controller of the computer is coupled to the network interface logic and the ULDR, to change, via programming, operational parameters of the ULDR based upon the type of PBX coupled to the ULDR and operational parameters of the network interface logic as a function of electrical characteristics of the type of PBX coupled to the ULDR and, to monitor and adjust signal level of signals in the ULDR.

14. A system according to claim 13, wherein the ULDR includes transmit/receive sections.

15. A system according to claim 14, wherein the transmit/receive interface sections include analog duplexer means for separating transmitted and received signals.

16. A system according to claim 14, wherein the transmit/receive interface sections include a receiver portion and a transmitter portion.

17. A system according to claim 16, wherein the receiver portion includes nulling circuit means to null a transmitting signal in the receiver portion.

18. A system according to claim 14, wherein the programmed controller monitors analog signals in the transmit/receive interface sections.

19. A system according to claim 18, wherein the analog signals in the transmit/receive interface sections include peak null voltages, peak signal levels and averaged and offset voltages.

20. A system according to claim 16, wherein the receiver portion includes comparators that have threshold voltages that are adjusted by the programmed controller.

21. A system according to claim 16, wherein the programmed controller adjusts transmit signal levels in the transmitter portions.

22. A system according to claim 16, wherein the receiver portion includes a digital potentiometer means for controlling signal levels therein.

23. A system according to claim 22, wherein the programmed controller adjusts the digital potentiometer means.

24. A system according to claim 16, wherein the transmitter portion includes:
impedance feedback compensation means; and
current driver means converted to the output of the impedance feedback compensation means for providing a balanced transmitting signal source.

25. A computer telephony system comprising:
a computer including a controller;
a computer telephony interface coupled to the computer;
a line driver interface coupled to the computer telephony interface; and
a digital telephone set coupled to the line driver interface;
the line driver interface including:
a network interface logic; and
a universal line driver/receiver (ULDR), coupled to the network interface logic and the digital telephone set, to automatically configure the network interface logic, the ULDR to adapt to different transmission and reception voltage levels and to match various telephone line impedances, and
wherein the controller of the computer is coupled to the network interface logic and the ULDR, to change, via programming, operational parameters of the ULDR based upon the type of PBX coupled to the ULDR and operational parameters of the network interface logic as a function of electrical characteristics of the type of PBX coupled to the ULDR, and to monitor and adjust signal level of signals in the ULDR.

26. A system according to claim 25, wherein the ULDR includes transmit/receive section.

27. A system according to claim 26, wherein the transmit/receive interface sections include analog duplexer means for separating transmitted and received signals.

28. A system according to claim 26, wherein the transmit/receive interface sections include a receiver portion and a transmitter portion.

29. A system according to claim 28, wherein the receiver portion includes nulling circuit means to null a transmitting signal in the receiver portion.

30. A system according to claim 26, wherein the programmed controller monitors analog signals in the transmit/receive interface sections.

31. A system according to claim 30, wherein the analog signals in the transmit/receive interface sections include peak null voltages, peak signal levels and averaged and offset voltages.

32. A system according to claim 28, wherein the receiver portion includes comparators that have threshold voltages that are adjusted by the programmed controller.

33. A system according to claim 28, wherein the programmed controller adjusts transmit signal levels in the transmitter portions.

34. A system according to claim 28, wherein the receiver portion includes a digital potentiometer means for controlling signal levels therein.

35. A system according to claim 34, wherein the programmed controller adjusts the digital potentiometer means.

36. A system according to claim 28, wherein the transmitter portion includes:
impedance feedback compensation means; and
current driver means converted to the output of the impedance feedback compensation means for providing a balanced transmitting signal.

37. A computer telephony system comprising:
a computer telephony interface;
a line driver interface coupled to the computer telephony interface;
a private branch exchange (PBX) coupled to the line driver interface; and
a digital telephone set coupled to the line driver interface;
the line driver interface including:
a network interface logic; and
a universal line driver/receiver (ULDR), coupled to the network interface logic, the PBX and the digital telephone set, to automatically configure the network interface logic, the ULDR to adapt to different transmission and reception voltage levels and to match various telephone line impedances, and
a programmed controller of a computer is coupled to the network interface logic and the ULDR, to changes via programming, operational parameters of the ULDR based upon the type of PBX coupled to the ULDR and operational parameters of the network interface logic as a function of electrical characteristics of the type of PBX coupled to the ULDR, and to monitor and adjust signal level of signals in the ULDR.

38. A system according to claim 37, wherein the ULDR includes a first transmit/receive interface section coupled to the PBX and a second transmit/receive interface section coupled to the telephone set.

39. A system according to claim 38, wherein the first and second transmit/receive interface sections include analog duplexer means for separating transmitted and received signals.

40. A system according to claim 38, wherein the first and second transmit/receive interface sections include a receiver portion and a transmitter portion.

41. A system according to claim 40, wherein the receiver portion includes nulling circuit means to null a transmitting signal in the receiver portion.

42. A system according to claim 38, wherein the programmed controller monitors analog signals in the first and second transmit/receive interface sections.

43. A system according to claim 42, wherein the analog signals in the first and second transmit/receive interface sections include peak null voltages, peak signal levels and averaged and offset voltages.

44. A system according to claim 40, wherein the receiver portion includes comparators that have threshold voltages that are adjusted by the programmed controller.

45. A system according to claim 40, wherein the programmed controller adjusts transmit signal levels in the transmitter portions.

46. A system according to claim 40, wherein the receiver portion includes a digital potentiometer means for controlling signal levels therein.

47. A system according to claim 46, wherein the programmed controller adjusts the digital potentiometer means.

48. A system according to claim 40, wherein the transmitter portion includes:
impedance feedback compensation means; and
current driver means converted to the output of the impedance feedback compensation means for providing a balanced transmitting signal source.

49. A computer telephony system comprising:
a computer including a controller;
a computer telephony interface coupled to the computer;
a private branch exchange (PBX) coupled to the computer telephony interface; and
a digital telephone set coupled to the computer telephony interface,
wherein the computer telephony interface including:
network interface logic; and
a universal line driver/receiver (ULDR) coupled to the network interface logic, the PBX, and the digital telephone set, to automatically configure the network interface logic, the ULDR to adapt to different transmission and reception voltage levels and to match various telephone line impedances, and
wherein the controller of the computer is coupled to the network interface logic and the ULDR, to change, via programming, operational parameters of the ULDR and operational parameters of the network interface logic as a function of electrical characteristics of the type of PBX coupled to the ULDR and to monitor and adjust signal levels of signals in the ULDR.

50. A system according to claim 49, wherein the ULDR comprises a first transmit/receive interface section coupled to the PBX and a second transmit/receive interface section coupled to the digital telephone set, and wherein the controller to monitor signal levels of signals in the first and second transmit/receive interface sections and send control signals to the first and second transmit/receive interface sections to make changes to operational parameters of the ULDR based on the monitored signal levels.

51. A system according to claim 50, wherein the controller to monitor signals in the first and second transmit receiver interface sections comprises the controller to monitor peak null voltage and peak signal levels in the first and second transmit/receive interface sections to determine the changes to be made to the operational parameters of the ULDR.

52. A system according to claim 51, wherein the controller to further monitor averaged and offset voltages in the first and second transmit receiver interface sections and to adjust the monitored signal levels to the desired levels.

53. A system according to claim 50, wherein the first and second transmit/receive interface sections each comprise a receiver portion including comparators with threshold voltages to be adjusted by the controller.

54. A system according to claim 53, wherein each receiver portion further includes a digital potentiometer to be adjusted by the controller to change the monitored signal levels to the desired levels.

55. A system according to claim 53, wherein the first and second transmit/receive interface sections each comprise a transmitter portion with transmit signal levels to be adjusted by the controller.

\* \* \* \* \*